(12) United States Patent
Wolfram et al.

(10) Patent No.: US 9,355,160 B2
(45) Date of Patent: May 31, 2016

(54) AUTOMATED DATA ANALYSIS

(71) Applicant: WOLFRAM ALPHA LLC, Champaign, IL (US)

(72) Inventors: Stephen Wolfram, Champaign, IL (US); Taliesin Sebastian Beynon, Cambridge, MA (US)

(73) Assignee: WOLFRAM ALPHA LLC, Champaign, IL (US)

( * ) Notice: Subject to any disclaimer, the term of this patent is extended or adjusted under 35 U.S.C. 154(b) by 433 days.

(21) Appl. No.: 13/763,568

(22) Filed: Feb. 8, 2013

(65) Prior Publication Data

US 2014/0229497 A1    Aug. 14, 2014

(51) Int. Cl.
   *G06F 17/30* (2006.01)
(52) U.S. Cl.
   CPC .... *G06F 17/30572* (2013.01); *G06F 17/30569* (2013.01)
(58) Field of Classification Search
   CPC ............... G06F 17/30345; G06F 17/30572
   See application file for complete search history.

(56) References Cited

U.S. PATENT DOCUMENTS

| | | | | |
|---|---|---|---|---|
| 2004/0193560 | A1* | 9/2004 | Atamer | 706/46 |
| 2005/0086579 | A1* | 4/2005 | Leitner et al. | 715/500 |
| 2007/0239361 | A1* | 10/2007 | Hathaway | 702/19 |
| 2013/0031082 | A1 | 1/2013 | Wolfram et al. | |

OTHER PUBLICATIONS

U.S. Appl. No. 12/780,685, filed May 14, 2010, Application as Filed, 32 pages.
AdviseStat, 'Advise Analytics', http://web.archive.org/web/20120515001517//adviseanalytics.com/advisestat, 3 pages, retrieved from the Internet on Nov. 13, 2012.
Cox, 'Regular Expression Matching with a Trigram Index or How Google Code Search Worked', Jan. 2012, http://swtch.com/~rsc/regexp/regexp4.html, 10 pages.
Viégas et. al., "ManyEyes: a Site for Visualization at Internet Scale", IEEE Transactions on Visualization and Computer Graphics, vol. 13, No. 6, pp. 1121-1128, 8 pages, 2007.
Wolfram Mathematica 8, 'Features of Mathematica 8: Data Sources & Analysis', http://web.archive.org/web/20121028113010//http://wolfram.com/mathematica/features/data . . . , 3 pages, 2012.
Wikipedia, 'Rete algorithm' definition, http://web.archive.org/web/20130324034239/http://en.wikipedia.org/wiki/Rete_algorithm, 6 pages, 2011.
Hanrahan et. al., 'Visual Analysis for Everyone', http://www.tableausoftware.com/sites/default/files/whitepapers/visual-analysis-for-everyone.pdf, 17 pages, Jan. 2007, Copyright 2012.
U.S. Appl. No. 13/608,817, filed Sep. 10, 2012, Application as filed, 33 pages.

* cited by examiner

*Primary Examiner* — Grace Park

(57) ABSTRACT

A compatibility of a computational analysis and a data set is automatically determined by comparing data set attribute data with attribute data of the computational analysis. Other computational analyzes may also be evaluated for compatibility with the data set. Compatible analyzes may be performed on the data set, and selected views of the results may be presented. Selection of the analyzes to be performed, the views, and/or the contents and format of the views may be determined based result data attributes and computational analysis attribute data as well as other considerations, such as resources required and multiplicity. As computational analysis attributes are based on a set of rules or statements determined from heuristics of respective computational analyzes, evaluation of the compatibility between various analyzes and the data set is accordingly determined based on the heuristic-based rules or statements. Computational analyzes may include visualizations and heavyweight computational analyzes.

28 Claims, 12 Drawing Sheets

Equation Solving:

Algebraic functions, differential functions, recurrence functions, functional equations and inequalities, linear systems, etc.

Graphs and Networks:

Finding paths, finding cycles, finding cliques, create families of graphs, generate random graphs, convert graph formats, etc.

Linear Algebra:

Matrix operations on symbolic matrices, numerical matrices, dense and sparse matrices, etc.

Discrete Calculus:

Symbolic operations, difference equations, generating functions, generating sequences, numerical discrete calculus operations, etc.

Polynomial Algebra:

Factoring, decomposition, structural operations, polynomial division, selection of optimal algorithms, etc.

Number Theory:

Activities for multiplicative, analytic, additive and algebraic number theory, including factoring, primes, congruences and modular arithmetic, etc.

Probability and Statistics:

Activities for statistical model analysis, exploratory data analysis, symbolic manipulation and numeric analysis, charting, etc.; and for determining properties and solvers of probability and statistics, parametric probability distribution, parameter estimation and testing, non-parametric and derived distributions, etc.

*FIG. 2A*

Calculus and Analysis:

Differentiation, integration, series, Fourier analysis, integral transforms, differential operators, activities for symbolic and numerical calculus, etc.

Computational Systems:

Modeling, discovering algorithms, activities for empirical and systematic study of computational systems, etc.

Logic and Boolean Algebra:

Quantifier elimination, satisfiability, equational-logic theorem proving, etc.

Visualizations:

Scatterplots, matrix charts, network diagrams, bar charts, block histograms, bubble charts, line graphs, stack graphs, stack graphs-by-categories, pie charts, tree maps, tree maps-for-comparison, word trees, tag clouds, phrase nets, word cloud generators, etc.

Other Activities:

Arbitrary-precision evaluation for complex values, arbitrary series expansion, relations, transformations, simplifications, etc.

```
PClass   Age    Sex      Survived
1st      29     female   1
1st      2      female   0
1st      30     male     0
1st      25     female   0
1st      0.92   male     1
1st      47     male     1
1st      63     female   1
1st      39     male     0
1st      58     female   1
1st      71     male     0
1st      47     male     0
1st      19     female   1
1st      NA     female   1
1st      NA     male     1
1st      NA     male     0
1st      50     female   1
1st      24     male     0
1st      36     male     0
1st      37     male     1
1st      47     female   1
1st      26     male     1
1st      25     male     0
1st      25     male     1
1st      19     female   1
1st      28     male     1
1st      45     male     0
1st      39     male     1
1st      30     female   1
1st      58     female   1
1st      NA     male     0
1st      45     female   1
1st      22     female   1
1st      NA     male     1
1st      41     male     0
1st      48     male     0
              ⋮
```

*FIG. 3*

FIG. 5B-1
FIG. 5B-2
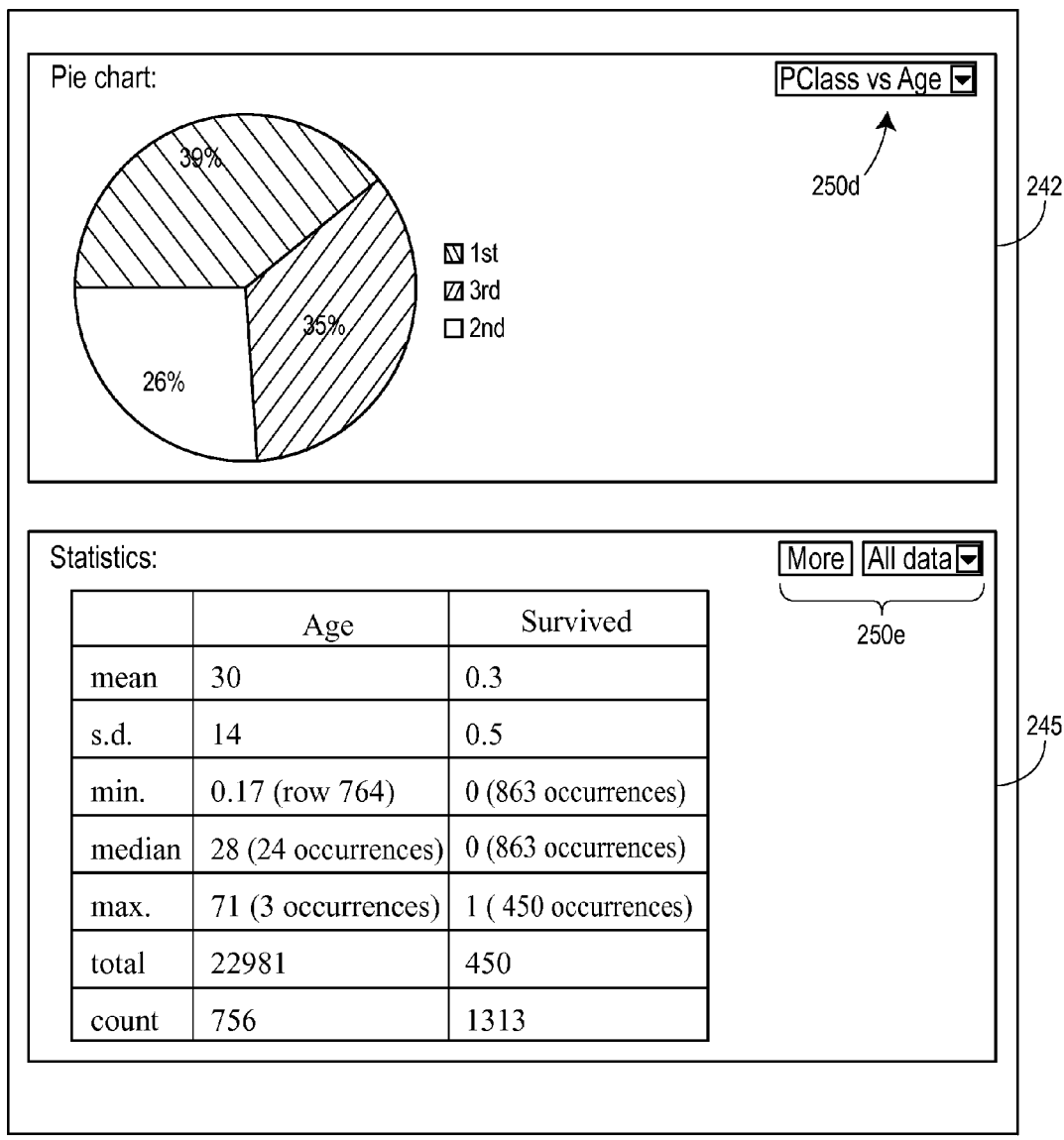
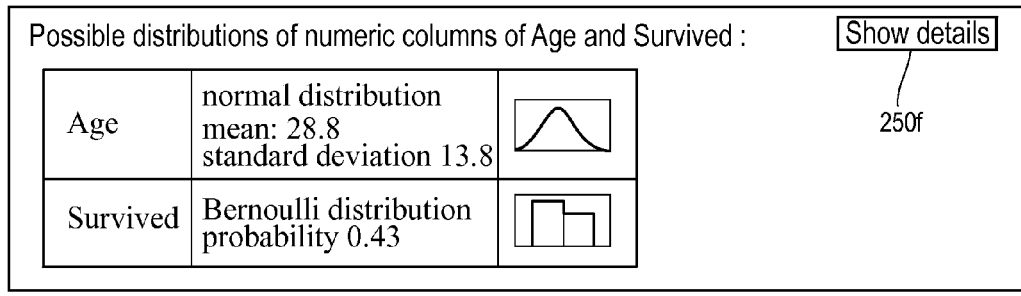

FIG. 5C-1

Regression analysis: [Predict: Survived ▼] [Show details]
272a { [Compare to PClass: 3rd, Sex: male ▼] }

| | |
|---|---|
| model | $P(y = 1) = \dfrac{1}{e^{-\alpha - \bar{x} \cdot \bar{\beta} - \varepsilon} + 1}$ |
| dependent variable | y (Survived) |
| independent variables | $x_1$ (PClass) (categorical)<br>$x_2$ (Age)<br>$x_3$ (Sex) (categorical) |

⎱ 255

| | estimate | confidence |
|---|---|---|
| $\alpha$ | -1.393 ±0.255 | >99% |
| $\beta_1$ [PClass = 1st] | 2.521 ±0.277 | >99% |
| $\beta_1$ [PClass = 2nd] | 1.229 ±0.237 | >99% |
| $\beta_2$ | -0.03918 ±0.00762 | >99% |
| $\beta_3$ [Sex = female] | 2.631 ±0.202 | >99% |

⎱ 258

272b — [90% confidence ▼]

Survived = 1 is more likely for PClass = 1st and 2nd than for PClass = 3rd

Survived = 1 is more likely for smaller Age

Survived = 1 is more likely for Sex = female than for Sex = male

⎱ 260

Statistical statements: [More] [90% confidence ▼]
272c the categories in PClass and Sex are statistically dependent (Chi-Square Test)

the categories in PClass and Survived are statistically dependent (Chi-Square Test)

the categories in Sex and Survived are statistically dependent (Chi-Square Test)

AUTOMATED DATA ANALYSIS

BACKGROUND

Data analysis tools and systems typically allow a user to input or enter a data set, such as by uploading a file to the system or, in some cases, by manually inputting data points or data values. The user may then select various visualizations of the data set provided by the tool or system to glean information about the data.

One such data analysis system is the Many Eyes Project of International Business Machines Corporation (IBM). The Many Eyes system allows users to upload data sets, perform visualizations on their own data sets or data sets uploaded by others, and share and comment on insights that the users observe from the various visualizations. The Many Eyes system requires a data set to follow specific formatting rules in order for a data set to be successfully uploaded and interpreted. For example, a data set must have a header describing the identity or context of the data to enable the Many Eyes system to correctly set up and label the visualizations. The header must be placed in the initial row of the data set, and the data set cannot include multiple header rows. Other rules and constraints on input data format are required by the Many Eyes Project system, e.g., all rows must be of the same length, and summary (e.g., total) rows must be deleted if the user does not want a summary row to be considered by the Many Eyes Project system as yet another distinct row of data values.

After a data set is uploaded into the Many Eyes system, a user may select one of a set of visualizations to perform on the uploaded set. For example, the Many Eyes Project system provides visualizations such as scatterplots, matrix charts, network diagrams, bar charts, block histograms, bubble charts, line graphs, stack graphs, stack graphs-by-categories, pie charts, tree maps, tree maps-for-comparison, word trees, tag clouds, phrase nets, and word cloud generators. A user selects which of these visualizations that he or she desires to be utilized with the uploaded data set.

Another example of data analysis tools or systems are the commercially available Tableau® Software products. Tableau asks a user to identify the format of the input data by selecting one of a set of known formats that are supported by Tableau (e.g., Microsoft® Excel, Cloudera® Hadoop Hive, IBM DB2, etc.). Once the data set is uploaded, the user drags and drops a column or a row of the uploaded data to a particular desired column or row of a Tableau-format data working space. Alternatively, a user may manually enter data by piecewise pasting data into rows or columns of the Tableau-format data working space.

Once a Tableau-format data set has been designated and generated by the user, the user selects one of a set of views to be applied to the Tableau-format data set. Similar to the Many Eyes Project, Tableau provides a suite of possible views from which the user makes a selection, e.g., data distribution graphs, scatter plots, bubble charts, geographical distributions, or bar charts.

Accordingly, the Many Eyes Project, Tableau Software, and other such data analysis tools and systems typically require that an object data set have a given, particular data set format in order to be properly interpreted. Furthermore, the selection of the views or visualizations to be performed on the uploaded data set is entirely directed by the user.

SUMMARY

In an embodiment, an automated data analysis system for automatically determining compatibility between a computational analysis and a target data set includes one or more tangible, non-transitory computer readable storage devices on which computational analysis attribute data is stored. The computational analysis attribute data comprises information or data that indicates one or more respective attributes of each computational analysis of a set of computational analyses, and the attributes of each computational analysis indicate characteristics or properties of data that is compatible with each computational analysis. That is, when a computational analysis is performed on data having the characteristics and properties reflected by the attributes of the computational analysis, a meaningful, useful, statistically interesting, or rich result is generated.

The one or more tangible, non-transitory computer readable storage devices are communicatively coupled to one or more computing devices storing computer-executable instructions, that when executed by a processor, cause the one or more computing devices to receive data set attribute data corresponding to a target data set. The data set attribute data comprises information or data indicative of one or more attributes of the target data set. The one or more computing devices may perform a comparison of the data set attribute data and computational analysis attribute data corresponding to a particular computational analysis of the set of computational analyses, and may determine a measure of compatibility between the target data set and the particular computational analysis based on the comparison. Further, the one or more computing devices may select a subset of one or more computational analyses from the set of computational analyses based on the measure of compatibility corresponding to the particular computational analysis, where the selected subset of the one or more computational analyses are to be performed on at least a portion of the target data. Additionally or alternatively, the one or more computing devices may cause an indication of the measure of compatibility corresponding to the particular computational analysis to be transmitted to another system or computing device, such as a user computer.

In another embodiment, a method for automatically analyzing data sets to determine compatible computational analyses includes receiving, via a communication link at one or more computing devices, data set attribute data, where the data set attribute data comprises information or data indicative of one or more attributes of a target data set. The method may also include performing a comparison of the data set attribute data and computational analysis attribute data corresponding to a particular computational analysis. The particular computational analysis may be one of a plurality of computational analyses, the computational analysis attribute data of the particular computational analysis may comprise information or data that is indicative of one or more attributes of the particular computational analysis, and the attributes of the particular computational analysis may indicate characteristics or properties of data with which the particular computational analysis is compatible. That is, when the particular computational analysis is performed on data having the characteristics or properties indicated by the attributes of the particular computational analysis, a meaningful, useful, statistically interesting, or rich result is generated.

The method also includes determining a measure of compatibility between the target data set and the particular computational analysis based on the comparison. Additionally, the method includes at least one of (i) selecting a subset of one or more computational analyses from the plurality of computational analyses based on the measure of compatibility corresponding to the particular computational analysis, where the selected subset of one or more computational analyses is to be performed on at least a portion of the target data set, or (ii) causing an indication of the measure of compatibility between the target data set and the particular computational analysis to be generated at a user interface.

In yet another embodiment, a system for supporting a data analysis includes a plurality of indication sets stored one or more tangible, non-transitory data storage devices. Each indication set includes indications of computational analysis attributes of a particular computational analysis of a plurality of computational analyses. The computational analysis attributes of each computational analysis indicate data characteristics or properties whose presence is necessary for data to be compatible with the computational analysis. Additionally or alternatively, the computational analysis attributes of each computational analysis indicate data characteristics or properties whose presence is preferred or sufficient for data to be compatible with the computational analysis.

The system for supporting a data analysis further includes an interface to the one or more tangible, non-transitory computer readable storage devices via which one or more computing devices are communicatively coupled. The one or more computing devices are configured to provide at least some of the indication sets to a data analysis system, where the data analysis system performs at least some of the plurality of computational analyses based on at least some of the indications included in the provided indication sets.

BRIEF DESCRIPTION OF THE DRAWINGS

FIGS. 2A and 2B are an illustrative and non-limiting list of lightweight and heavyweight computational analyses that may be performed on a target or object data set, according to an embodiment;

FIG. 3 illustrates a portion of the contents of a sample data set used in an illustrative scenario employing the example system of FIG. 1;

FIGS. 4A-4B and 5A, 5B-1, 5B-2, 5C-1 and 5C-2 illustrate example displays that may be generated at a user interface by the example system of FIG. 1 in the illustrative scenario.

DETAILED DESCRIPTION

Embodiments described herein may be utilized in a system for automated data analysis. The automated data analysis (ADA) system may receive a target or object data set, and the system may analyze the provided data set to determine contexts of and relationships among the data points or data values included therein. Based on the determination of the contexts and relationships among the data values, and without requiring any user input (at least in some embodiments), the system may automatically (at least in some embodiments) determine a set of suitable or compatible computational analyses to apply to the data set, e.g., a set of computational analyses that, when performed on the data set, generates rich, meaningful, useful and/or statistically interesting results. The determination of the set of suitable or compatible computational analyses may be based on a comparison of attributes of the data set with attributes of various computational analyses. In some embodiments, the determination of the set of suitable or compatible computational analyses may also be based on previously performed data analyses, resource usage, previous or current user actions, user input, and/or other suitable or desired factors.

In some embodiments, after determining the set of suitable or compatible computational analyses for the provided data set, the automated data analysis system may present identifications of at least some of the suitable or compatible computational analyses to a user. In some embodiments, the system may automatically apply at least some of the one or more computational analyses to the data set, and may present corresponding results to the user. Typically, the reception of the target data set, the determination of the set of suitable or compatible computational analyses, the execution of at least some of the set of suitable or compatible computational analyses, and/or the generation and display of the results of the executed analyses, in some embodiments, is accomplished by the automated data analysis system in a real-time manner and/or with a reasonably short delay.

Figure 1:
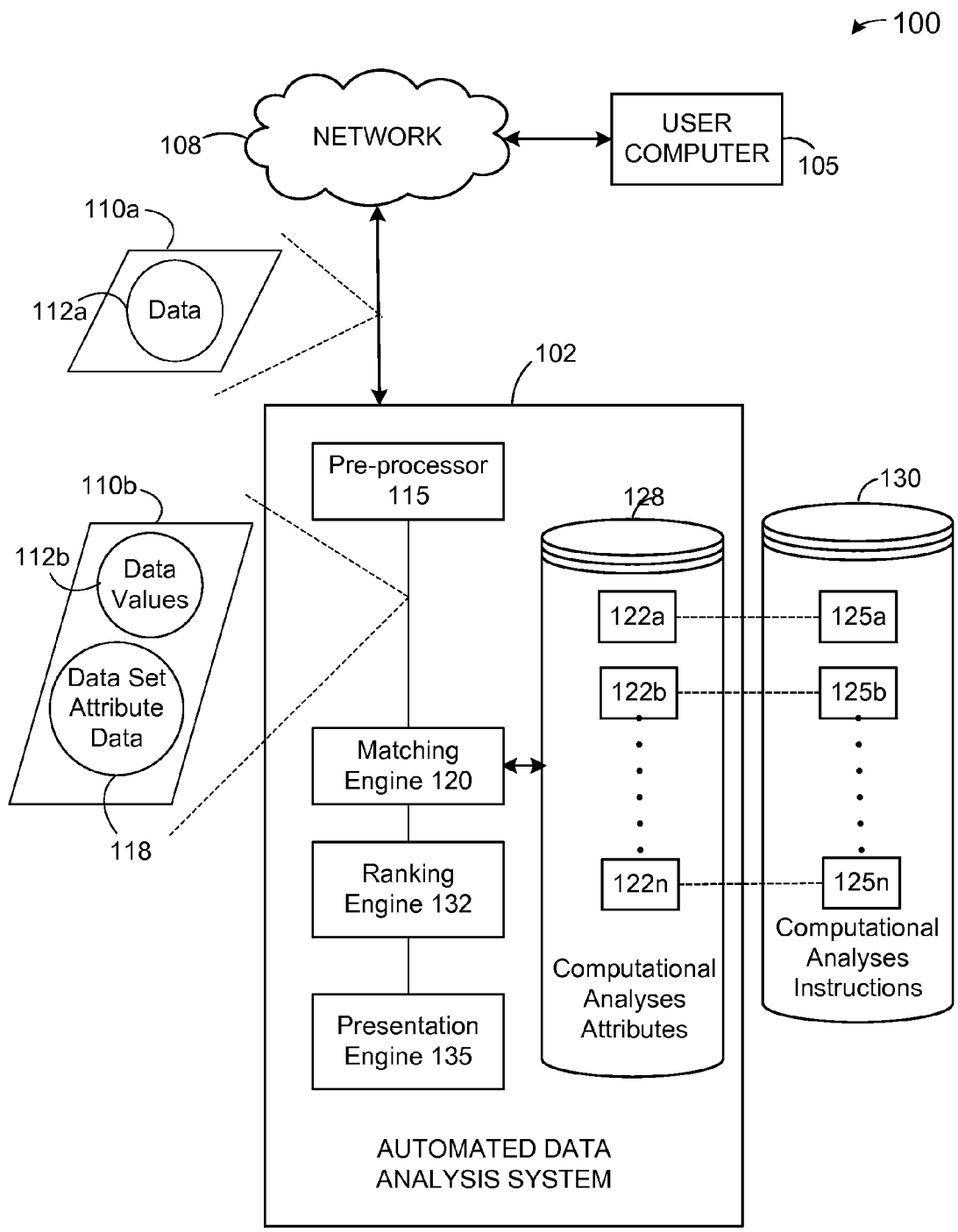
FIG. 1 is a block diagram of an example system for automatically analyzing a data set, according to an embodiment.

FIG. 1 is a block diagram of an example system 100 for automatically analyzing a data set, according to an embodiment. The system 100 includes an automatic data analysis (ADA) system 102. As described in more detail below, the ADA system 102 is configured to automatically analyze a data set and to automatically determine, at least in some embodiments, suitable and/or compatible computational analyses that, when applied to the data set, provide rich, meaningful, useful or statistically interesting results. The system 100 may include a user computer or computing device 105 communicatively coupled to the ADA system 102 via a communication network 108. The communications network 108 may include one or more of a local area network (LAN), a wireless LAN, a wide area network (WAN), a mobile communications network, the Internet, or any other suitable public or private wired or wireless communication network.

In an embodiment, a user may input, upload or identify an original data set 110a via a user interface at the computing device 105. The user interface may be included in, for example, a web interface or a client of the ADA system 102 executed by one or more processors of the computing device 105. The original data set 110a may be delivered from the computing device 105 via the network 108 to the ADA system 102, in an embodiment. The original data set 110a may be referred to herein as a "target" or "object" data set on which the ADA system 102 may operate, and the original data set 110a may be interchangeably referred to herein as an input data set to the ADA system 102.

The original data set 110a may include a set of data 112a. The data 112a may include natural language characters or strings, the data 112a may include symbolic language such as numeric or alphanumeric characters and expressions, and/or the data 112a may include graphs, images, and other types of data. The data 112a may be arranged in any structured or semi-structured format. However, for the data 112a of the original data set 110a to be operated on by the ADA system 102, the ADA system 102 need not have a priori knowledge of the structure of the original data set 110a, in some embodiments. Indeed, not only does the ADA system 102 not need to know the structure of the original data set 110a, the original data set 110a is not required to include (e.g., may exclude) any information that identifies the contexts, identities, or categories of the data values, such as a header or labels, in some embodiments and/or scenarios. Instead, the ADA system 102 may analyze the data 112a and their interrelationships, and may automatically determine the contexts, identities, or categories of the data 112a based on the analysis. As such, the original data set 110a is not required to be of a known database or spreadsheet format at all, such as Microsoft Excel, SQL, Hadoop, etc., in some embodiments.

Generally speaking, the data 112a included in the original data set 110a may only be required to be, at a minimum, arranged or grouped in some consistent manner so that the ADA system 102 is able to determine or deduce a structure of the original data set 110a, in an embodiment. That is, the input data set 110a is only required to be in a consistent, structured or semi-structured arrangement, in some embodiments. Nonetheless, if the original data set 110a does include context or category information, the ADA system 102 may still be able to properly interpret the data values of the data set 110a, in some embodiments. Indeed, the original data set 110a may include any number of header rows or columns that include context, identity, and/or category information, such as zero, one, two, or more header rows and/or columns.

In an embodiment, a pre-processor 115 of the automated data analysis system 102 may receive the original data set 110a, analyze the data 112a of the original data set 110a and their interrelationships, and automatically determine contexts, identities, relationships, categories and/or structure(s) of the data 112a within the data set 110a based on the analysis. For example, the pre-processor 115 may analyze the data 112a of the original data set 110a to determine one or more groupings, sets, or subsets of data values therein that are contextually related. Each grouping of data values may be contextually related, structurally related, and/or related in some other manner. For example, a grouping of data 112a of the original data set 110a may correspond to a struct or a structure of the original data set 110a, such as one actual column of data values, more than one actual column of data values, one actual row of data points, more than one actual row of data values, an actual column and an actual row of data values, or all data of the original data set 110a (e.g., all the data 112a). Additionally or alternatively, a grouping of the original data set 110a may include a list of data values, a hierarchy of data values (e.g., Extensible Markup Language (XML)), a collection of data values, a random set of data values, a graph (e.g., a set of vertices and edges), or any other data 112a that are related by context, structure, and/or in some other manner. In some scenarios, a particular grouping may itself include a plurality of groupings or sub-groupings. To illustrate the term "grouping," an entire set of data values of an example data set of banking information may be a first grouping of the example data set, a second grouping of the example banking information data set may be customer information, a third grouping may be account numbers, a fourth grouping may be account balances, and a fifth grouping of the example data set may be dates.

Returning to FIG. 1, based on the analysis of the data 112a of the original data set 110a, the pre-processor 115 may determine a number of groupings of the original data set 110a and the identity or context of each grouping. For example, the pre-processor 115 may determine one grouping, two groupings, or more than two groupings and their respective identities, contexts, or relatedness. In some cases, a particular data value may be included in more than one grouping. That is, the groupings of a data set are not required to be mutually exclusive sets.

Accordingly, in an embodiment, the pre-processor 115 may determine a converted data set 110b from the original data set 110a, where the converted data set 110b includes the data values 112b, the contexts or identities of one or more groupings or sets of the data values 112b, a respective indication of which of the data values 112b are included in each grouping, and information or data 118 that is indicative of attributes of the converted data set 110b. The information or data 118 indicative of the attributes of the converted data set 110b is interchangeably referred to herein as "data set attribute data 118" of the converted data set 110b. In an embodiment, at least a portion of the data set attribute data 118 may be metadata. A particular datum of the data set attribute data 118 may be indicative of one or more attributes of the converted data set 110b, in an embodiment.

The data set attribute data 118 may identify one or more attributes of the converted data set 110b, and/or may describe one or more attributes of the converted data set 110b. The data set attribute data 118 may define one or more attributes of the data set 110b, in some embodiments, and/or may suggest one or more attributes of the data set 110b, in some embodiments. In some embodiments, the data set attribute data 118 may correspond to one or more attributes of the converted data set 110b. In some embodiments, the data set attribute 118 may be associated with one or more attributes of the converted data set 110b.

An "attribute" of the converted data set 110b (or a "data set attribute" of the converted data set 110b, as used herein), generally refers to a characteristic or property of the converted data set 110b or of at least a portion of the data 112b included therein. For example, a data set attribute of the data set 110b may be a statistical or semantic property of a grouping of the data set 110b. Examples of data set attributes may include a type of the data values in a grouping (e.g., labels, entities, decimal numbers, floating point numbers, binary numbers, etc.); whether the data values of a grouping are serially correlated; whether all of the data values of a grouping are of the same length; whether an interval between successive data values of a grouping is constant; whether the data values of a grouping are randomly or uniformly distributed; a range of the data included in a grouping; an indication of other types of data values or objects with which the data values of a grouping may be combined; an indication of transformations that may be applied to a grouping; and other suitable data set attributes.

Referring again to the banking information data set example as an illustration, an attribute of the grouping "account balance" may be that the data values of "account balance" each have a numerical format with a decimal point, with any number of digits to the left of the decimal point and with two or less digits to the right of the decimal point. An attribute of a grouping "customer tax identification number" may be that the data values of "customer tax identification number" each have a nine digit numerical format ABC-DE-FGHI or ABCDEFHI. An attribute of a grouping "customers" may indicate that at least some data values included therein have at least two alphabetical strings <<FirstName>> <<LastName>>.

In an embodiment, the pre-processor 115 may perform only a subset of the pre-processor capabilities and functionalities discussed herein. For example, while the pre-processor 115 discussed above has the capability to automatically determine the contexts or identities of the data 112a by analyzing the contents and the interrelationships of the data 112a, if the original data set 110a does include headers, the pre-processor 115 may use the headers of the original data set 110a to determine the contexts or identities of the data 112a without analyzing the contents and the interrelationships of the data 112a.

In an embodiment, the ADA system 102 is operable with pre-processors other than the pre-processor 115. For example, the ADA system 102 may receive a data set from a prior art type of pre-processor that is only able to operate on data sets of approved, specific input file formats. As another example, the ADA system 102 may receive a data set from a prior art type of pre-processor that requires user input to define the structure of the data set (e.g., user input specified columns), the types of data in the data set, etc. In another embodiment, a pre-processor (whether the pre-processor 115 or another pre-processor) may be omitted from the ADA system 102 altogether.

The data set attribute data 118 of the converted data set 110b may be provided to the matching engine 120, e.g., by the pre-processor 115, or directly by the network 108 in embodiments without the pre-processor 115. The matching engine 120 may receive the data set attribute data 118, and may compare the data set attribute data 118 with information or data 128 that is indicative of attributes of a set of computational analyses 125a-125n (also referred to interchangeably herein as "computational analysis attribute data 128"). For example, the computational analysis attribute data 128 may include one or more indication sets 122a-122n, each of which may be indicative of one or more attributes of a respective computational analysis 125a-125n that may be performed on or applied to an object or target data set. For example, computational analysis attribute data that is indicative of attributes of the computational analysis 125a may be stored in indication set 122a, and computational analysis attribute data that is indicative of the attributes of the computational analysis 125b may be stored in indication set 122b. In an embodiment, at least some of the computational analysis attribute data 128 may comprise metadata.

Each indication set 122a-122n may identify one or more attributes of a respective computational analysis 125a-125n, and/or may describe one or more attributes of the respective computational analysis 125a-125n. Each indication set 122a-122n may define one or more attributes of the respective computational analysis 125a-125n, in some embodiments, and/or may suggest one or more attributes of the respective computational analysis 125a-125n, in some embodiments. In some embodiments, each indication set 122a-122n may correspond to one or more attributes of the respective computational analysis 125a-125n. In some embodiments, each indication set 122a-122n may be associated with one or more attributes of the respective computational analysis 125a-125n.

The ADA system 102 may store or have access to the computational analysis attribute data 128. In an embodiment (not shown), at least a portion of the computational analysis attribute data 128 may be stored with respective computational analyses 125a-125n of a set of computational analyses 130, e.g., the computational analysis attribute data 128 and the set of computational analyses 130 may be (at least partially) integrally stored. In another embodiment, the computational analysis attribute data 128 may be stored separately from any actual computational analyses 125a-125n. For example, as illustrated in FIG. 1, the actual computational analyses 125a-125n (or the executable instructions corresponding thereto) may be stored separately 130 from the computational analysis attribute data 128, however, the computational analyses or executable instructions corresponding thereto (reference 130) may still remain accessible to the ADA system 102, such as via a communication interface. Further, while in FIG. 1 the computational analysis attribute data 128 is shown as being included in the ADA system 102, in some embodiments, the computational analysis attribute data 128 is excluded from or not integral to the ADA system 102, but is nonetheless accessible to the ADA system 102 via a communication interface.

Based on the comparison of the data set attribute data 118 with the computational analysis attribute data 128, the matching engine 120 may determine one or more suitable and/or compatible computational analyses for the converted data set 110b, such as a subset of the computational analyses 125a-125n. The identity of the one or more suitable and/or compatible computational analyses may be presented at the user interface of the computing device 105, e.g., via the network 108. In some embodiments, one or more of the suitable or computational analyses 125 may be automatically performed by the ADA system 102 on the converted data set 110b to generate a result, and the result may be presented at the user interface of the computing device 105. The aforementioned determination of compatible computational analyses and data sets is described in more detail below after an explanation of various terms used herein is provided.

A "computational analysis," as used herein, generally refers to one or more computing actions or computations that may be performed on, applied to, executed on, or operated on at least a portion of data values included in an object or target data set. For example, a computational analysis may be applied to an entire object data set as a whole, or to one or more groupings of the object data set. An execution of a computational analysis on a data set may be interchangeably referred to herein as the data set being transformed by the computational analysis. Each computational analysis may be implemented as a set of machine readable instructions that, when executed by one or more processors, perform the computational analysis on a set of input data.

Note that while a computational analysis may perform a mathematical or computing action, the result of a computational analysis need not be expressed in a computational, graphical, or numerical language. For example, a phrase net computational analysis uses computational pattern matching to determine relationships between words in a text, but the output of a phrase net analysis may only display the words of the text and differently-sized pictorial arrows showing the interrelationships of the words.

Some computational analyses supported by the ADA system 102 may be relatively simple or lightweight. Examples of simple or lightweight computations are "views" or "visualizations." Examples of visualizations include scatter plots, matrix charts, network diagrams, bar charts, block histograms, bubble charts, line or stack graphs, stack graphs for categories, pie charts, tree maps, tree maps for comparisons, word trees, tag clouds, phrase nets, word cloud generators, and geographical map distributions, and the like. Other examples of lightweight computations are calculating an average of a group of numbers, calculating a standard deviation of the group of numbers, etc.

Other computational analyses supported by the ADA system 102 may include more complex or heavyweight computational analyses. Typically, when a complex or heavyweight analysis is performed on a first data set, a second data set different from the first data set (as contrasted with a mere visualization of the first data set) may be generated. Examples of such complex or heavyweight computational analyses may include various different types of integration, differentiation, Fourier analysis, symbolic manipulation and numeric analysis, regression, symbolic matrices, numerical discrete calculus, logic and Boolean algebraic analyses, N-dimensional computations, etc. FIGS. 2A and 2B provide a detailed and non-limiting list of possible lightweight and heavyweight computational analyses that may be supported by the ADA system 102.

A "computational analysis attribute" (e.g., an "attribute" of a computational analysis) may indicate a characteristic or property of the computational analysis itself. Additionally or alternatively, an attribute or computational analysis attribute of a particular computational analysis may indicate a characteristic or property of an object data set that is compatible with the particular computational analysis, e.g., an object data set that, when transformed by the particular computational analysis, generates a meaningful or useful result (e.g., a statistically meaningful result). As such, an "attribute" of the particular computational analysis may indicate a constraint on one or more inputs to the particular computational analysis. Generally, computational analysis attributes corresponding to a particular computational analysis may be based on a set of rules or statements that are generated or determined from heuristics of the computational analysis and of data sets operated on by the computational analysis over time. One of many examples of such a rule or statement based on heuristics may be "the closer the value of a coefficient of determination ($R^2$) generated by a regression computational analysis on a data set is to one, the more compatible the data set is to the "regression" computational analysis."

An example of a computational analysis attribute may be an indication of the lengths of time to perform the computational analysis on inputs of differing or increasing lengths, e.g., a result of an asymptotic analysis of the computational analysis to determine limiting behavior. Another example of a computational analysis attribute may include an indication of how the analysis parallelizes, e.g., an indication of how suitable the computational analyses is for being performed using a set of multiple, concurrent sub-operations. Other examples of attributes of computational analyses may include a parameter that is required as an input to the computational analysis before the computational analysis is operable, a type or data type of the input on which the computational analysis is operable, a linguistic form of a required parameter or input, a type or data type of an output generated by an execution of the computational analysis, and other suitable computational analysis attributes.

A computational analysis attribute may be a required attribute or a preferred (e.g., sufficient) attribute. For example, for a Fourier series computational analysis, a suitable or compatible set of target or object data values is required to have data spaced at uniform time intervals. On the other hand, a preferred or sufficient (but not required) attribute of the Fourier series computational analysis is a set of target or object data values having a non-random distribution. For example, a Fourier series computational analysis of randomly distributed data will likely produce an uninteresting result, while a Fourier series analysis of non-randomly distributed data is likely to produce a more interesting result, based on an example associated rule derived from heuristics. Accordingly, a required attribute of a particular computational analysis may be a necessity for the particular computational analysis to execute, whereas a preferred attribute or a sufficient attribute may be an option that increases the likelihood that the particular computational analysis will produce a useful and/or interesting result.

Additionally, a computational analysis attribute may be functional or parametric. Whether or not a target data set comports (at least partially, if not entirely) with a functional attribute of a computational analysis may be determined by executing a function on data set attribute data that corresponds to the target data set, or that corresponds to a grouping of data values included in the target data set. For example, at least a portion of data set attribute data corresponding to a target grouping may be input into a function associated with the functional computational analysis attribute. In an embodiment, the function corresponding to the functional computational analysis attribute may be indicated by the functional computational analysis attribute data. The resulting output of the function may indicate if (and/or the extent to which) the target grouping comports (at least partially, if not entirely) with the functional attribute of the computational analysis.

Using an example time series computational analysis to illustrate, an example of a preferred attribute for a time series computational analysis is for the data values to be non-randomly distributed, e.g., having some underlying characteristics of smoothly varying values over time and/or having patterns that repeat over time. To determine whether or not a target grouping comports with the "non-random distribution" attribute, data set attribute data corresponding to the target grouping may be input to a functional calculation corresponding to the "non-random distribution" attribute of the time series computational analysis. The output of the functional calculation may include an indication or measure of the non-randomness of the data values of the target grouping, and the indication or measure of the non-randomness may be used to determine the measure of compatibility between the computational analysis and the data set in which the target grouping is included.

On the other hand, in contrast to a functional attribute, a parametric attribute of a computational analysis may be a characteristic that can be compared to an already-determined attribute of a grouping of data values. As an illustrative example, a parametric attribute of a computational analysis may be a requirement that the target data set include only non-negative numeric values.

Some computational analyses may be applied to multiple groupings or sets of data values included a data set. Accordingly, computational analysis attributes may correspond to attributes of multiple groupings of a data set. For example, a regression computational analysis may be applied to two or more groupings of data values of a data set, and a computational analysis attribute for the regression computational analysis may be that each target grouping of data values have the same number of data values.

Returning to FIG. 1, the computational analysis attribute data $122a$-$122n$ may include information or data that is indicative of required attributes, preferred or sufficient attributes, functional attributes, parametric attributes, and/or other types of computational analysis attributes. As such, for a particular computational analysis, a target grouping that has more data set attributes comporting with preferred computational analysis attributes (as indicated by respective attribute data) may be considered to be more suitable or compatible for the particular computational analysis than is another target grouping that has less data attributes comporting with the preferred computational analysis attributes (as indicated by respective attribute data). A particular computational analysis may be evaluated, using attribute data comparison, for compatibility with different sets of target or object groupings of the data set $110b$.

As discussed above, in an embodiment, the matching engine 120 may determine a measure of compatibility and/or suitability of the data set $110a$ to a particular computational analysis (e.g., computational analysis $125a$) based on a comparison of at least a portion of the data set attribute data 118 and at least a portion of the computational analysis attribute data (e.g., computational analysis attribute data $122a$). The measure of compatibility may represent a degree of compatibility between the particular computational activity and the data set $110a$. In an embodiment, a range of the measure of compatibility may be binary, e.g., incompatible and compatible. In an embodiment, a range of the measure of compatibility may be continuous over more than two absolute values, e.g., a range of zero to 100 with zero representing incompatible and 100 representing perfect or near-perfect compatibility. In an embodiment, the measure of compatibility may be represented by a probability or by another statistical format. For example, the measure of compatibility may include a probability of incompatibility between the particular computational analysis and the data set 110a, or may include a probability of compatibility between the particular computational analysis and the data set 110a. Accordingly, in view of the above, a measure of compatibility may include an indication of a measure of incompatibility (e.g., the converse of a measure of compatibility may be the measure of incompatibility).

In some embodiments, the measure of compatibility and/or suitability may also be based on one or more other compatibility criteria, such as a time required to execute the particular computational analysis 125a on the data set 110b, on a portion thereof, or on one or more groupings of the data set 110b; the processing power, bandwidth and/or other resource usage required to perform the particular computational analysis 125a on the data set 110b, on a portion thereof, or on one or more groupings of the data set 110b; a number or multiplicity of sub-analyses, sub-activities or sub-operations that are required to be performed in order to execute the particular computational analysis 125a on the data set 110b, on a portion thereof, or on one or more groupings of the data set 110b; and/or other compatibility criteria. The ability of the data set 110b to meet one or more additional compatibility criteria may be determined based on the data set attribute data 118 and the computational analysis attribute data 122a, for example.

In an embodiment, the matching engine 120 may evaluate the suitability and/or compatibility of the particular computational analysis 125a to the converted data set 110b by evaluating a subset of the data values 112b of the data set 110b. For example, the matching engine 120 may determine a measure of compatibility of the data set 110b to the computational analysis 125a on a per-grouping basis, e.g., by comparing respective data set attribute data indicative of each of one or more groupings of the data set 110b with the computational analysis attribute data 122a.

In an embodiment, the matching engine 120 may select the set of one or more groupings, and/or the matching engine 120 may select at least one data set attribute (corresponding to the one or more groupings) of the data set attribute data 118 whose information is to be compared with the conceptual analysis attribute data 122a. In an embodiment, the matching engine 120 may select the set of one or more groupings and/or at least one data set attribute based on a data value included in a grouping of the data set 110b that is not included in the comparison. Additionally or alternatively, the matching engine 120 may select the one or more groupings and/or the at least one data set attribute based on one or more other selection criteria, e.g., one or more respective attributes of the another grouping excluded from the comparison, a result of a previously performed comparison of the computational analysis 125a, a result of another previously performed comparison of another computational analysis, or another suitable selection criteria.

The matching engine 120 may perform multiple comparisons corresponding to multiple, different groupings of the data set 110b to determine the measure of compatibility of the data set 110b and the particular computational analysis 125a, in some scenarios. In an embodiment, at least some of the multiple comparisons performed by the matching engine 120 may be performed in parallel, e.g., by respective instances of the matching engine 120 executing in parallel. In an embodiment, at least some of the multiple comparisons may be performed sequentially by a single instance of the matching engine 120. Indeed, any one or more of these and other above discussed techniques may be used by the matching engine 120 to determine a measure of compatibility between the data set 110b and a particular computational analysis (e.g., computational analysis 125a).

In some embodiments, multiple computational analyses (e.g., two analyses, three analyses, or any multiple number of computational analyses) may be compared with the data set 110b. In particular, computational analysis attribute data of multiple computational analyses (e.g., indications 122a, 122b, 122c, 122d) may be respectively compared to the data set attribute data 118 of the data set 110b. In an embodiment, one or more of the multiple computational analyses may be automatically selected by the matching engine 120, manually selected by the user, or automatically selected by the matching engine 120 based partially on user input. For example, a second computational analysis 125b may be selected based on a previously compared computational analysis (e.g., with the data set 110b or with another data set). For instance, after comparing computational analysis attribute data 122a to the data set attribute data 118, the matching engine 120 may automatically select an additional computational analysis attribute indication set 122b for comparison with the data set attributes 118 based on the comparison of the analysis attribute data 122a. Additionally or alternatively, the matching engine 120 may automatically select an additional computational analysis based on previously performed user actions. For example, the matching engine 120 may select an additional computational analysis 125c for comparison based on computational analyses that were performed on data sets that were previously uploaded by the user.

In an embodiment, the user may provide input into the selection of a computational analysis (e.g., the analysis 125d) whose computational analysis attribute data (e.g., the attribute data 122d) is to be compared against data set attribute data 118. For example, the user may select an additional computational analysis 125d to be compared with and/or performed on the data set 110b after the user is presented with the results of the performance of the first computational analysis 125a on the data set 110b. In another example, the matching engine 120 may automatically select one or more additional computational analyses (e.g., the analysis 125b or 125c as discussed above) for possible comparisons, transmit indications of the additional analyses 125b, 125c to the user computer 105, and receive a user input indicating a user confirmation of which of the suggested additional computational analyses 125b, 125c are to be compared with and/or performed on the data set 110b.

In an embodiment, the matching engine 120 may perform a comparison of (i) computation analysis attribute data 122a-122n of each of more than one computational analysis 125a-125n and (ii) data set attribute data 118 of the data set 110b, and may generate a separate measure of compatibility for each of the compared computational analysis.

In an embodiment, the matching engine 120 may provide the measures of compatibility of the multiple compared analyses to a ranking engine 132 of the ADA system 102. The ranking engine 132 may compare the measures of compatibility to determine a ranking, e.g., from most compatible to least compatible computational analysis or vice versa, by assigning the computational analyses into bands of compatibility, or by determining one or more clusters of measures of compatibility.

The matching engine 120 may select at least a subset of the compared computational analyses to perform on the data set 110b. In an embodiment, the matching engine 120 selects the at least the subset based on the ranking. For example, the matching engine 120 may select all compared computational analyses above a particular ranking or threshold for performance on the data set 110b, or the matching engine 120 may select a subset of the compared computational analyses corresponding to a cluster of measures of compatibility. In some scenarios, all compared computational analyses may be selected to be performed, e.g., when all respective measures of compatibility meet a selection criterion, when a user indicates as such a priori, or as a default. In some scenarios, the at least the subset of compared computational analyses may be selected based on a resource or time required to the respective compared computational analysis on the data set 110b, or based on a multiplicity of sub-operations or sub-analyses for the respective compared computational analysis. In an embodiment, the at least the subset of compared computational analysis is selected based on a parameter. In some scenarios, none of the compared computational analyses may be selected to be performed, and an indication of such may be presented to the user at the computer 105. The matching engine 120 may cause at least the selected subset of compared computational analyses to be automatically applied to, executed, operated, or performed on the data set 110b or on a portion thereof (e.g., on one or more groupings of the data set 110b).

The application, execution, operation or performance of the at least the selected subset of compared computational analyses on the data set 110b may generate respective results for each performed computational analysis. Each respective result may include respective result content data. As such, the performance of a particular computational analysis on the data set 110b may generate another different data set of different data points or data values, e.g., when the particular computational analysis is a heavyweight computational analysis.

In some embodiments, each respective result may also include information or data that is indicative of one or more contexts, characteristics or properties of the result content data, e.g., information indicative of attributes of the result content data (or "result attribute data"). For example, the result attribute data may identify one or more attributes of the result content data, and/or may describe one or more attributes of the result content data. The result attribute data may define one or more attributes of the result content data, in some embodiments, and/or may suggest one or more attributes of the result content data, in some embodiments. In some embodiments result attribute data may correspond to one or more attributes of the result content data. In some embodiments, the result attribute data may be associated with one or more attributes of the result content data.

Examples of result attributes may include a set of clusters, a domain (e.g., time, complex frequency), a range, and other attributes identifying properties and/or characteristics of the result content data. In an illustrative example, a regression analysis computational analysis may be performed on the data set 110b. The set of result content data generated by the performance of the regression analysis may include a regression model expressed in a mathematical expression, and an identification of the independent and dependent variables of the regression model, and an example result attribute of each independent and dependent variable may be a respective level of confidence. Result attribute data may be represented by metadata, in an embodiment.

In some embodiments, the automated data analysis system 102 may include a presentation engine 135. The presentation engine 135 may be configured to indicate, at the user interface of the computing device 105 or at another user interface, the manner in which the original data set 110a was interpreted by the pre-processor 115, in an embodiment. For example, the presentation engine 135 may cause information corresponding to the converted data set 110b, the contents of the converted data set itself 110b, or portions thereof to be presented or displayed.

In an embodiment, the presentation engine 135 may be configured to indicate, at the user interface of the computing device 105 or at another user interface, the at least the subset of the computational analyses that were applied to the converted data set 110b. For example, the presentation engine 135 may cause identifications of one or more determined computational analyses to be presented, and/or the results of any executed computational analyses on the data set 110b.

The presentation engine 135 may additionally be configured to select a view or visualization of the converted data set 110b, and/or to select a view or visualization of the result content data of a computational analysis performed on the converted data set 110b. Additionally, the presentation engine 135 may cause the views or visualizations to be presented at the user interface of the computing device 105. As previously discussed, a view or visualization of a data set may be a particular presentation of at least a portion of the data included in a data set. For example, a first view of the data set 110b may include contextual labels and data values of three groupings of the data set 110b arranged in a tabular format, e.g., "Bank Branch," "Account Type," and "Balance." A second view of the data set 110b may display at least some of the groupings in a pie chart format, e.g., one pie chart per Bank Branch showing the percentages of different Account Types at the particular Bank Branch. Yet a third view may describe the at least some of the groupings using natural language, e.g., "$X of the liabilities at Bank Branch N are attributed to Account Type Z." Similarly, different views of at least portions of the result content data may respectively include a tabular format, a graphical format, a chart, natural language, etc. In some embodiments, a view or the visualization may require a lightweight computation to be performed.

The presentation engine 135 may be configured to select a particular view based on one or more view criteria. In some embodiments, the view may be a default view for a particular computational analysis, e.g., a pie chart and a bar chart may be default views for a cluster computational analysis. In some embodiments, a view may be selected based on attributes of the result of a performance of the particular computational analysis, e.g., the view may be selected at least partially based on result attribute data. For example, if a result attribute (as indicated by the result attribute data) is that the result content data values are distributed over equally spaced time intervals, a linear graph view may be selected to present the result context data.

In some embodiments, in addition to result attribute data, a view may be additionally or alternatively selected based on other view criteria, for example, a user selection or input for the particular data set or computational analysis, types of views the user has selected in the past, a type of computing device 105 or user interface on which the view is to be presented, and/or other view criteria. For example, a user may indicate whether he or she desires results of a regression analysis to be presented in a three-dimensional view or a flat view, or the matching engine 120 may automatically select a particular type of regression view based on the user's choice.

Additionally, in some embodiments, the presentation engine 135 and/or the matching engine 120 may determine the axes, dimensions, components, contents, etc., to be included on a particular graph view, at least in part based on the meaningfulness to the user in light of the contents and contexts of the result content data points or values. For example, based on the analysis of the converted data set 110b, the ADA system 102 may determine that a line graph of grouping C vs. grouping D may provide more meaningful information than a line graph of grouping C vs. any other grouping. The ADA system 102 may determine that a pie chart of the data in groupings F, M and P is useful, whereas pie charts of other groupings are not informative or even nonsensical. The determination of the axes, dimensions, components, contents, etc., to be included on a particular view may be made by the ADA system 102 based on the data set attribute data 118, computational analysis attribute data 128, and/or on result attribute data, in an embodiment.

In an embodiment, to enable data analysis to be performed on the data set 110b, the ADA system 102 includes a "hub" into which data set attribute data, computational analyses attribute data of one or more computational analyses, and (in some scenarios) result attribute data is input. In an embodiment, the hub includes at least portions of the matching engine 120, the ranking engine 132 and the presentation engine 135. Generally, the hub may determine compatibility between groupings, computational analyses, results, and/or views based on respective attribute data, and may automatically determine whether or not additional groupings, computational analyses, and/or views may be compatible or appropriate to compare, perform or generate as part of the comprehensive analysis of the data set 110b. In an embodiment, the hub may assess compatibility between the data set 110b and various computational analyses based on a set of rules or statements that characterize data sets that are compatible with each computational analysis, and that characterize the relationships between the compatible data sets and the each computational analysis. Typically, the set of rules or statements may be generated or determined from heuristics determined or derived from previously performed instances of computational analyses on various data sets, or from other sources.

Furthermore, while in FIG. 1 the ADA system 102 is shown as being communicatively connected with the user computer 105 via the network 108, other types of connections are possible. In some embodiments, at least a portion of the ADA system 102 may reside on the user computer 105. For example, at least a portion of the ADA system 102 may be a plug-in to an application executing on the user computer 105, such as database application. The database application may provide data from one or more rows and/or columns as input into the ADA system 102 for analysis, e.g., when a user selects a control within the database application. In another example, at least a portion of the ADA system 102 may a client or stand-alone application residing on the user computing device 105 that is in communicative connection with one or more other applications also residing on the computing device 105.

In some embodiments, the ADA 102 (whether executing on one or more remote computing devices as shown in FIG. 1, or executing at least partly on the user computing device 105) may be in communicative connection with other systems and/or applications. For example, the ADA system 102 may exchange messages with an application stored in a cloud or at a remote computing device, or the ADA system 102 may be a service that may be invoked by various other local or remote applications, e.g., via an application programming interface (API). In some embodiments, the ADA system 102 may provide information or data to another local or remote system or application, e.g., via an API, in response to a query, automatically to a receiving system or application that is identified a priori, to a receiving system or application that is specified in real-time, etc. For example, the ADA system 102 may provide result content data and/or result attribute data to another system or application, such as to a computing application, a natural language system, or a custom application. The ADA system 102 may provide an indication of the measure of compatibility between a particular computational analysis and the data set 110b to another system and/or application. The ADA system 102 may additionally or alternatively provide other information or data to one or more local or remote systems or applications, such as an indication of at least a portion of the data set attribute data 118, an indication of at least a portion of the computational analysis attribute data 128, an indication of at least a portion of the computational analysis attribute data 128 corresponding to a specific computational analysis, an indication of the subset of computational analyses that were determined to be suitably compatible with the data set 110a, heuristic information corresponding to a particular user, data set, and/or computational analysis, and other information or data.

To illustrate the concepts and features presented herein, an example scenario is provided. In this example, a data set is input into the automated data analysis system 102, and the ADA system 102 determines compatible computational analyses, performs the compatible computational analyses on the data set, and generates corresponding results. The results are generated and presented by the ADA system 102 in real-time, i.e., the results appear on the user interface within a second or two of entering the data set.

FIG. 3 is a reproduction of a portion of the contents of a sample input data set 202 used in the example scenario. The sample input data set 202 was obtained on Jan. 27, 2013 from http://lib.stat.cmu.edu/S/Harrell/data/descriptions/titanic.html, and includes data corresponding to passengers who sailed on the Titanic. Each row of the data set 202 corresponds to a different Titanic passenger. "P-Class" indicates the passenger's class of travel (i.e., first, second or third class).

Figure 4A:
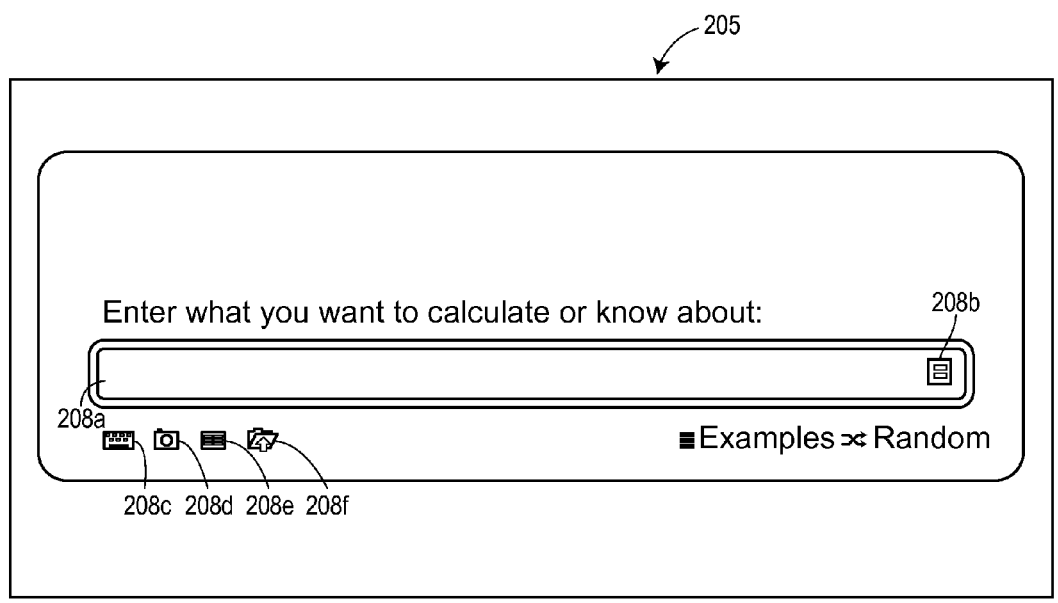
Figure 4B:
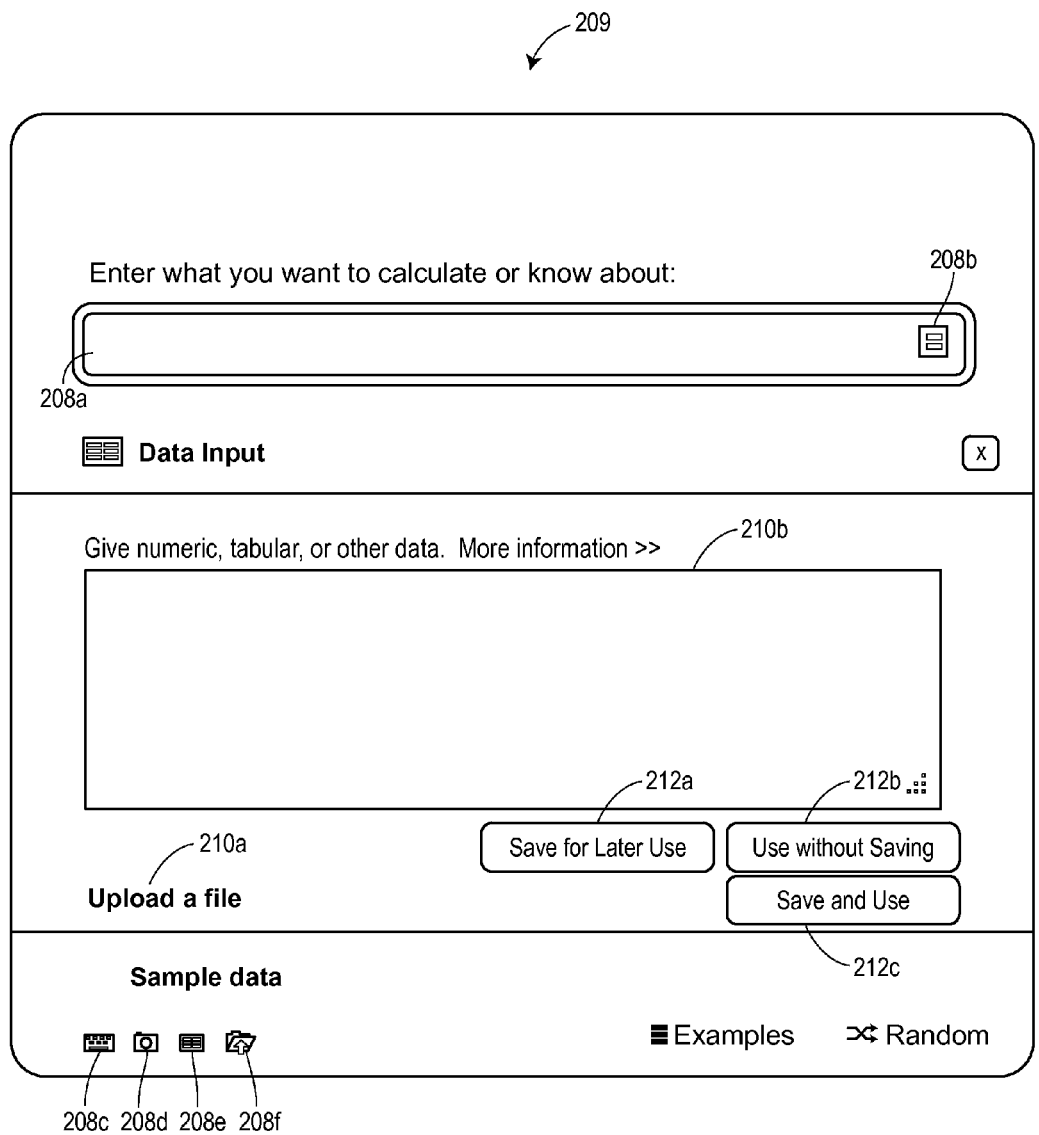

FIGS. 4A and 4B illustrate screen shots or displays corresponding to data input at the automated data analysis system 102, according to an embodiment. In particular, FIG. 4A illustrates a screen shot of a data entry screen 205 of a user interface of the ADA system 102. The ADA system 102 causes the screen 205 to be displayed on a display device of the user computer 105, in an embodiment. The data entry screen 205 may include multiple user controls 208a-208f for facilitating a user to input data to the ADA system 102. For example, the entry screen 205 may include a text box 208a into which natural language input may be entered, with a corresponding "enter" user control 208b to signify when a user has finished entering all desired input into the text box 208a. The entry screen 205 may include several selectable icons 208c-208f respectively corresponding to an extended keyboard 208c, an image input 208d, a data input 208e, and a file upload 208f. In an example scenario, a user selects the control 208e to input data.

In response to the selection of the data input control 208e, the ADA system 102 may cause the screen 209 shown in FIG. 4B to be displayed on the display device of the user computer 105, in an embodiment. The screen 209 may include one or more of the user controls 208a-208f from the previous screen 205, and may also include one or more other controls 210a, 210b to enable data input. For example, a user may indicate an input data set by entering its file name in the text box 208a, or the user may select the upload user control 210a to browse the user's file system and select particular a data set to upload. In the example scenario, though, the user cuts and pastes the contents of the data file 202 as a whole into the data input entry area 210b. Once the user has finished entering data (via one of the controls 208a, 210a or 210b or via another data entry control), the user may select the control 212a to save the entered data, the control 212b to have the system 102 analyze the entered data without saving it, or the control 212c to have the system 102 save and analyze the entered data.

Figure 5A:
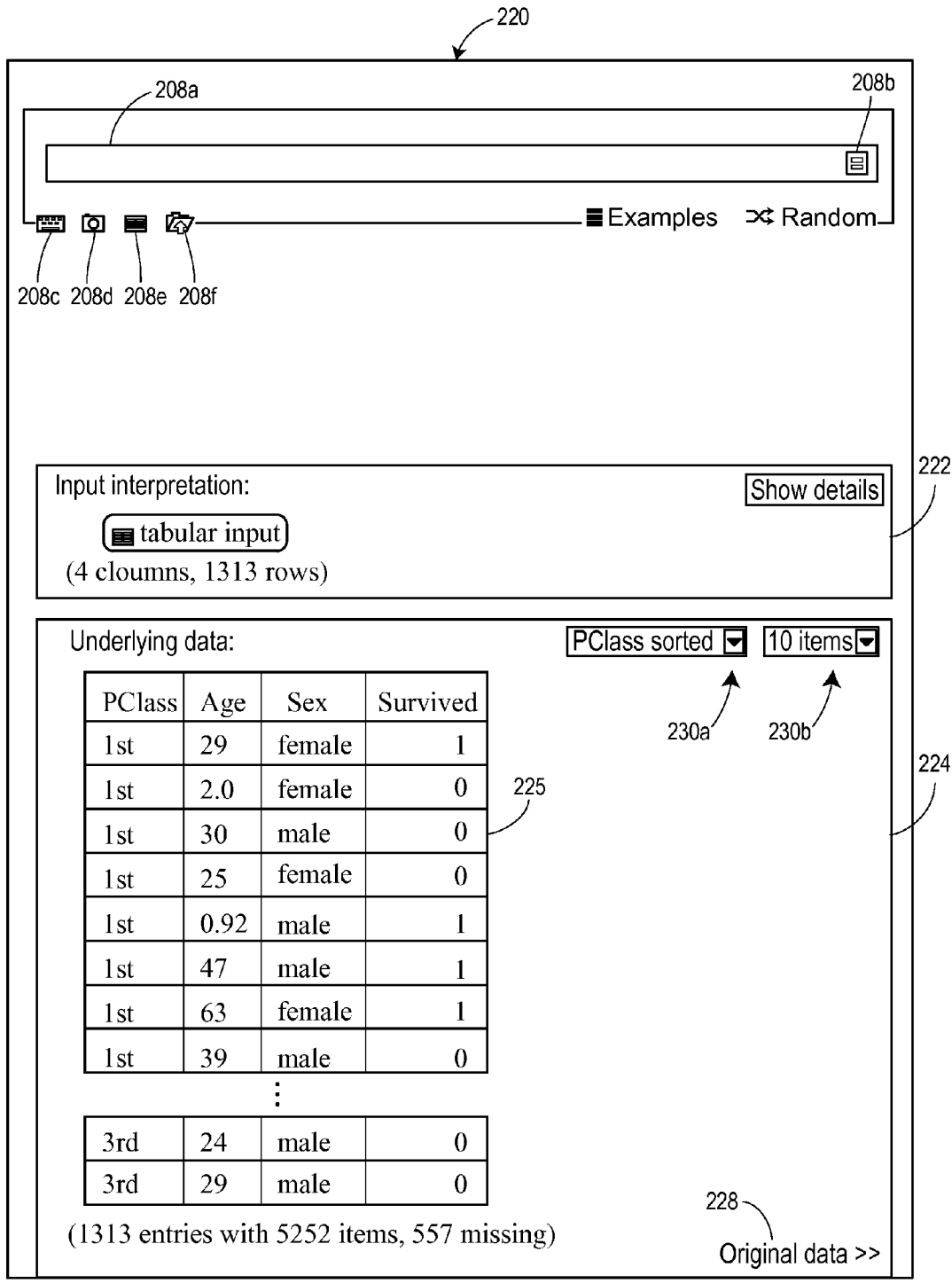
Figures 1, 2, 5B:
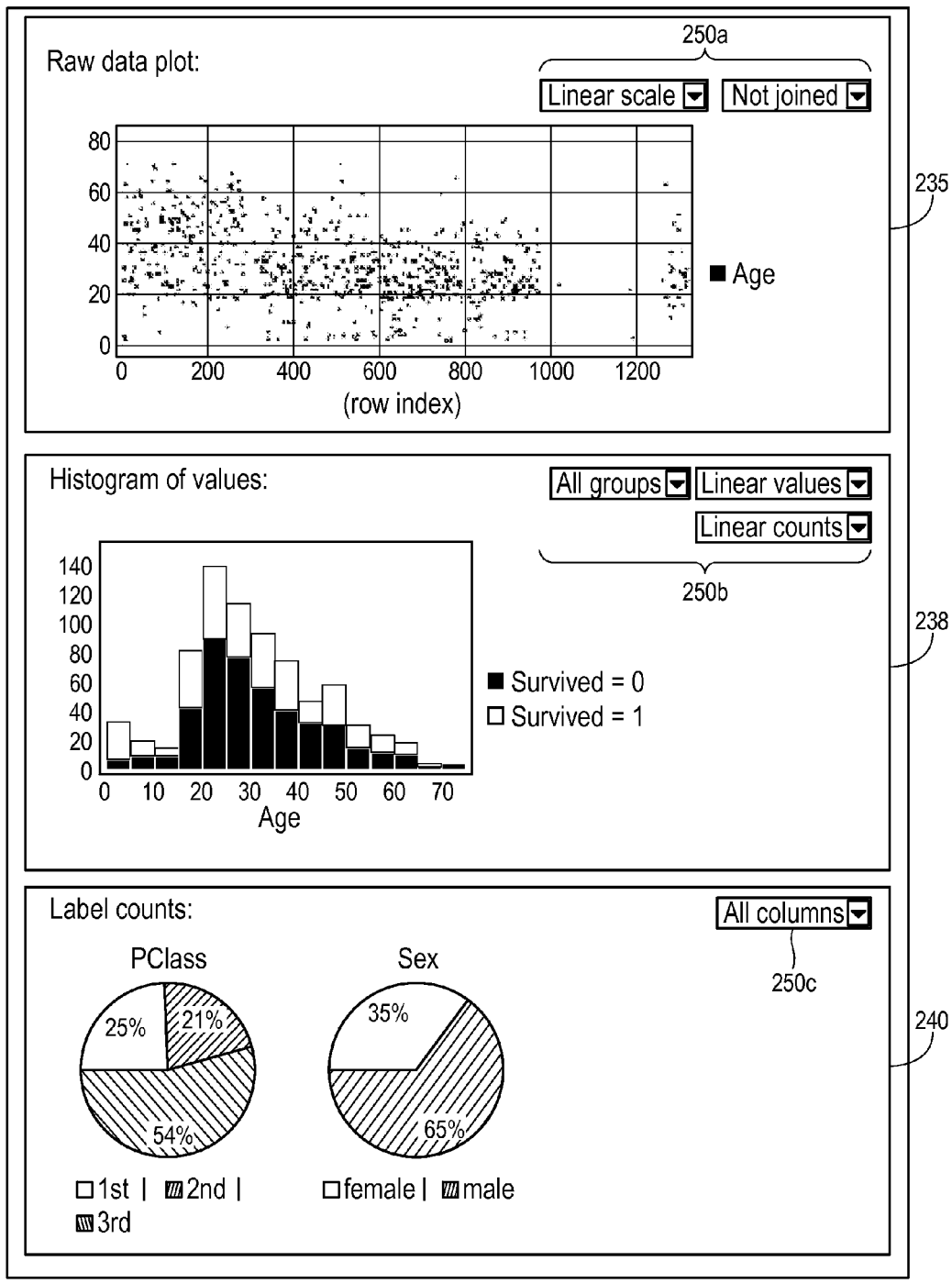
Figures 1, 2, 5C:
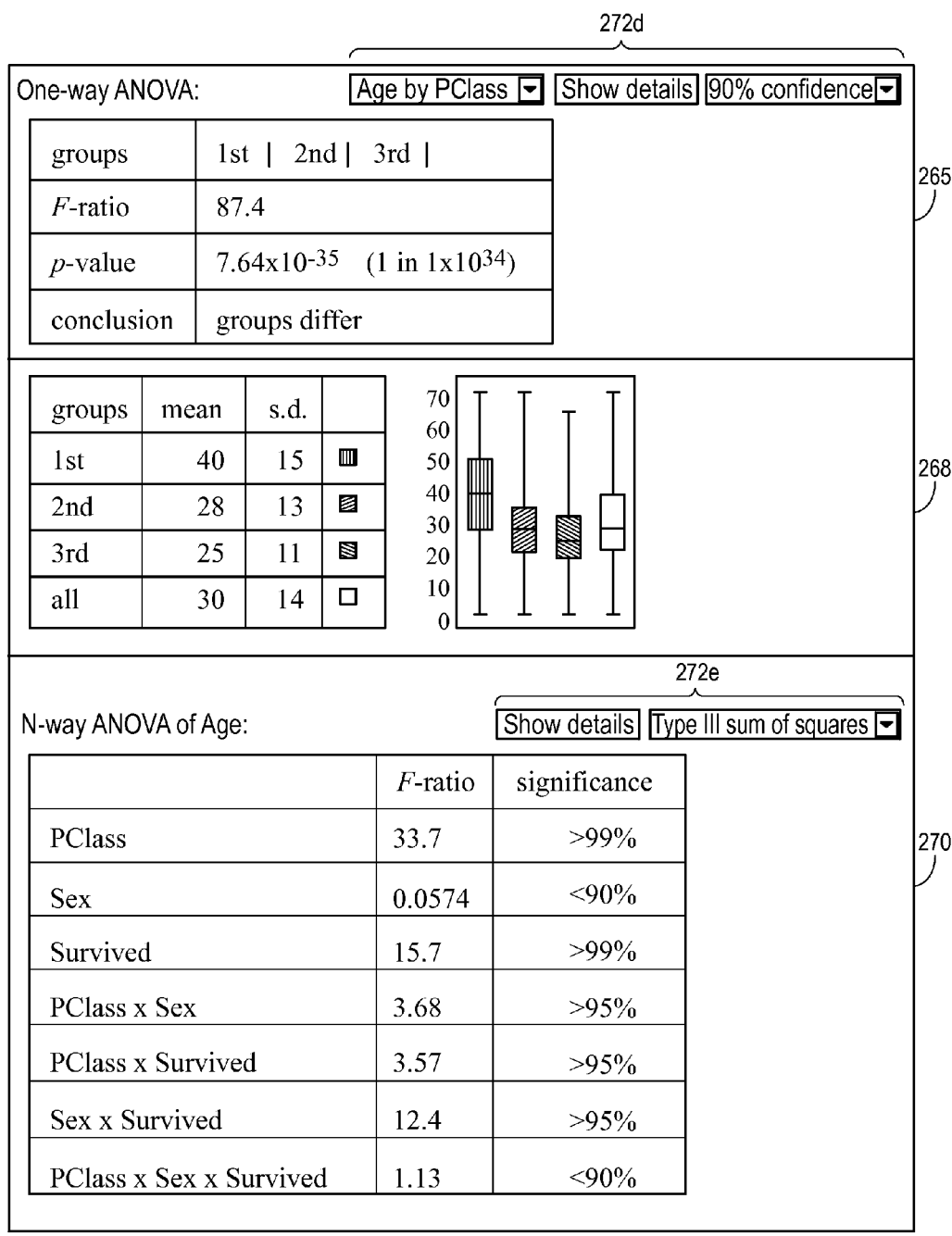

Portions of example output which may be presented after the automated data analysis system 102 has analyzed the input data 202, according to an embodiment, are shown in FIGS. 5A-5C. For example, the ADA system 102 may cause the screen 220 of FIG. 5A to be displayed on the display device of the user computer 105, in an embodiment. The screen 220 may indicate the manner in which the pre-processor 115 of the ADA system 102 interpreted the user input data 202 that was previously entered (e.g., that was previously entered via the screen 209). The screen 220 may include two portions 222 and 224, in an embodiment. A first portion 222 may indicate how the format of the input data 202 was interpreted by the ADA system 102. In the example scenario, the first portion 222 of the screen 220 indicates that the ADA system 102 interpreted the format of the material pasted into the data input entry area 210b as a tabular input having four columns and 1313 rows. A second portion 224 of the screen 220 may indicate how the contents of the input data 202 were interpreted by the ADA system 102. That is, the second portion 224 may include a representation or view of a converted data set 225 that was generated by the ADA system 102 from the original data set 202. In this example scenario, the ADA system 102 has identified four groupings in the original data set 202, i.e., PClass, Age, Sex and Survived, and thus included the four groupings in the converted data set 225. Further, the ADA system 102 has generated respective data attribute sets (e.g., metadata) corresponding to each of the groupings PClass, Age, Sex and Survived, as well as for the entire converted data set 224 as a whole (although the data attributes are not shown on the screen 220). The screen 220 may additionally provide a user control 228 to enable the user to view the original data set 202, and the screen 220 may provide one or more user controls 230a, 230b to enable the user to change the view or presentation of the converted data set 225, such as by sort order, size of display, and other factors.

FIG. 5B-1 and FIG. 5B-2 illustrate a selected set of views 235-248 showing the results of lightweight computational analyses or visualizations that were determined by the ADA system 102 to be meaningful based on the analysis of the contexts and contents of the converted data set 225. Indeed, not only were the visualizations 235-248 selected by the ADA system 102, but the particular inputs to each visualization 235-248 and the axes, dimensions, and formats for presentation of each visualization were also determined and selected by the ADA system 102, e.g., based on at least the meaningfulness of the contexts and contents of the data set 225, as is discussed below.

In the example scenario, one of the visualizations or lightweight computational analyses that was performed on the data set 225 and that was determined by the ADA system 102 as including rich or useful information is a raw data plot 235 of the ages of passengers. The ADA system 102 determined that the raw data scatter plot 235 is a compatible and useful computational analysis to perform on the data set 225 as compared to at least some of the other possible computational analyses. For example, the ADA system 102 compared the metadata corresponding to attributes of "raw data scatter plot" with the metadata indicative of the data attributes of the converted data set 225. Based on this comparison, the measure of compatibility of the data set 225 and the "raw data scatter plot" computational analysis was determined to be relatively high as compared to the measures of compatibility of the data set 225 and at least some other computational analyses (e.g., word trees, bubble charts, and logarithm histograms).

Furthermore, the ADA system 102 determined that plotting the passenger ages in the raw data scatter plot was more meaningful than, for example, plotting passenger class or survival of all passengers in a raw data scatter plot. In particular, one of the computational analysis attributes of "raw data scatter plot" (as determined by heuristics and/or by other sources) indicates that performing a raw data scatter plot on a range of data values that is wider provides more meaningful results than performing the raw data scatter plot on a narrower range of data values. As such, the ADA system 102 examined the metadata of the groupings of the converted data set 225 and determined that the grouping PClass has a range of only three values (i.e., $1^{st}$ class, $2^{nd}$ class and $3^{rd}$ class), the grouping Sex has a range of only two values (i.e., female and male), and the grouping Survived has a range of only two values (i.e., 1 and 0). On the other hand, the grouping Age has a far wider range of values from approximately 0 to approximately 80. Accordingly, based on a comparison of the metadata corresponding to the data attributes of the groupings, the ADA system 102 determined that the grouping Age has the widest range of values, and therefore Age is the most compatible grouping on which to perform the computational analysis "raw data scatter plot." Accordingly, the ADA system 102 performed a raw scatter plot on the grouping Age and presented the results in view 235.

A second visualization or lightweight computational analysis that the ADA system 102 determined to be compatible and useful to perform on the data set 225 is a linear histogram 238 showing the number of survivors/non-survivors vs. age. Similar to the first visualization, the ADA system 102 compared the metadata corresponding to attributes of "linear histogram" with the metadata indicative of the data attributes of the groupings of the converted data set 225, and the measure of compatibility of "linear histogram" was determined to be relatively high as compared to the measures of compatibility of other computational analyses (e.g., word trees, bubble charts, and logarithm histograms). Additionally, the ADA system 102 determined that, for the data set 225, number of survivors/non-survivors vs. age was more meaningful to perform and present than, for example, passenger class vs. age or sex vs. age. The ADA system 102 was able to make this determination in a manner similar to that discussed for the "raw data scatter plot" computational analysis, e.g., by comparing the data attribute data of each grouping with the information indicative of the attributes of "linear histogram" to determine the most compatible combination of groupings to use on the x and y axes of the linear histogram, and by comparing grouping attribute metadata and "linear histogram" attribute metadata.

Other example visualizations produced in this example scenario include label counts 240 by groupings (e.g., PClass and Sex), pie charts 242 of one grouping vs. another grouping (e.g., PClass vs. Age), basic or simple statistics 245, and basic or simple distributions 248. Typically, each visualization 235-248 may include one or more respective user controls 250a-250f via which a user may select a different view or arrangement of the analyzed data 225.

Furthermore, in this scenario, the set of displayed visualizations 235-248 represent a set of more compatible visualizations for the data set 225 as compared to other visualizations, as determined by the ADA system 102 based on comparing measures of compatibility. For example, the measures of compatibility of the visualizations 235-248 were more tightly clustered than other measures of compatibility of other visualizations (e.g., word trees, bubble charts, logarithmic histograms), and based on the clustering, the ADA system 102 selected the set of visualizations 235-248 to perform.

In addition to determining and performing a set of lightweight computational analyses 235-248, the ADA system 102 of the example scenario has also determined and performed a set of one or more heavyweight computational analyses that are compatible with the data set 225, one of which is illustrated by FIGS. 5C-1 and 5C-2 (reference 252). Similar to the lightweight computational analyses or visualizations 235-248, the heavyweight or complex computational analyses were determined by the ADA system 102 to be meaningful based on the analysis of the contexts and contents of the converted data set 225. Additionally, the particular inputs to the complex computational analyses, the axes, dimensions, and formats for presentation of their results were also determined and selected by the ADA system 102 based on at least the meaningfulness of the contexts and contents of the data set 225. However, unlike the lightweight computational analyses or visualizations, the heavyweight or complex computational analyses typically generate another, different set of data as an output, rather than merely present a view or visualization of the input data set 225.

FIGS. 5C-1 and 5C-2 illustrate one of these heavyweight computational analyses, i.e., a regression analysis 252. In particular, in the example scenario, the ADA system 102 determined (e.g., at least by comparing the computational analysis attribute data of the "regression analysis" computational analysis with the data set attribute data of the data set 225) that a regression analysis is a compatible computational analysis that would generate meaningful results when performed on the data set 225. The ADA system 102 caused the regression analysis to be performed on the data set 225, and the ADA system 102 caused the results 255 of the regression analysis to be presented to the user. The results 255 include, for example, a regression model and identities of the variables of the model (i.e., dependent variable "Survived" and independent variables "PClass," "Age," and "Sex").

To determine the identities of the independent and dependent variables, again the ADA system 102 examined the data attribute metadata of groupings in comparison with the computational analysis attribute metadata. For example, multiple combinations of possible independent/dependent variables are possible for the data set 255, e.g., Survived=f(PClass, Age, Sex); PClass=f(Survived, Age, Sex); Age=f(Survived, PClass, Sex) and Sex=f(Survived, PClass, Age). By examining the metadata of groupings and determining correlations (if any) to metadata of other groupings, the ADA system 102 determined the combination of independent/dependent variables that was the most compatible with the metadata of regression analysis that characterizes variable interdependency. Based on at least this comparison (and on other comparisons), the ADA system 102 determined that Survived=f (PClass, Age, Sex) was more compatible with regression analysis than were any of the other combinations.

However, in the ADA system 102, the metadata examination for compatibility purposes need not be exhaustive across all possible combinations. For example, in the regression computational analysis example 252, the multiplicity of total sub-operations required to perform the regression analysis may be dynamically bounded based on the results of various sub-operations. For example, if the ADA system 102 initially determines that Survived depends on PClass, the ADA system 102 can forgo assessing whether or not PClass depends on Survive. Further, given the determination that Survived depends on PClass, the ADA system 102 may proceed with assessing whether or not Survived depends on any other variables, and may not perform further assessments on other combinations (e.g., does Age depend of PClass or does Age depend on Sex) if the correlations between Survived and the other variables are determined to be high or above a particular threshold.

In this example regression analysis scenario, the ADA system 102 also determined estimates and respective confidences 258 for the determined variables, which are shown in the view 258. Additionally, in the views 260 and 262, the ADA system 102 caused one or more conclusory or summary statements (e.g., using a natural language) that are based on the executed regression analysis 252 to be presented. As such, the ADA system 102 determined that, in addition to the regression analysis results 255, the particular views 258-262 of selected portions of the result content data 255 of the regression analysis would be meaningful and therefore caused the views 258-262 to be presented to the user.

The ADA system 102 additionally determined one or more other views 265, 268, 270 of the regression analysis computational analysis 252 whose identity and contents are meaningful for the data set 225. In particular, view 265 provides a one-way analysis of variance (ANOVA) of the data set 225, view 268 provides overall means and standard deviations and by passenger class in both a tabular and a graphical format, and view 270 provides an N-way ANOVA of age.

Similar to the lightweight computational analyses views 235-248, the views 255-270 associated with a complex computational analysis 252 may each include one or more user controls 272a-272e via which a user may select a different arrangement of output.

Of course, the example scenario described with respect to FIGS. 3, 4A-4B, 5A, 5B-1, 5B-2, 5C-1 and 5C-2 is illustrative only, and is not limiting. Other types of data sets may be input to the ADA system 102. Furthermore, other lightweight and heavyweight computational analyses may be compared with a data set to determine compatibility, e.g., one or more analyses listed in FIGS. 2A and 2B, or other computational analyses. Additionally, other suitable views may be determined and displayed based on the analysis of the input data.

Figure 6:
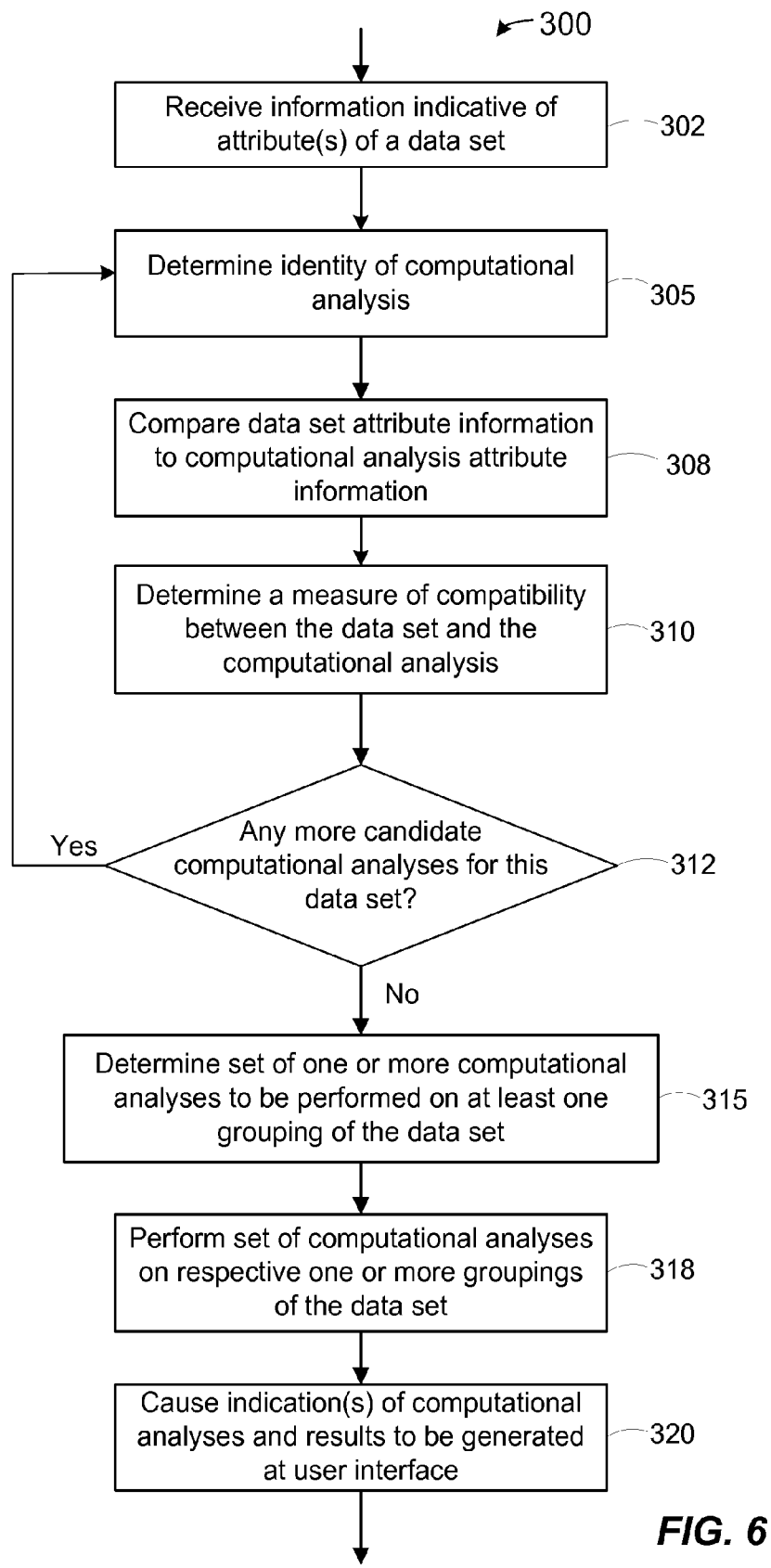
FIG. 6 is a flow diagram of an example method that may be implemented by the example system of FIG. 1, in an embodiment.

FIG. 6 is a flow diagram of an example method 300 for automatically analyzing data sets. The method 300 may be implemented, at least partially, by the automated data analysis system 102 of FIG. 1, or by other suitable systems. In an embodiment, at least some of the method 300 may be implemented by the matching engine 120 of the ADA system 102.

The method 300 may include receiving information or data that is indicative of one or more attributes of a data set (block 302), e.g., the data set attribute data 118 of FIG. 1. The data set attribute data may be received, for example via a communication link, a bus, etc., at one or more computing devices which are configured to execute at least a portion of the method 300. In an embodiment, the one or more computing devices at which the data set attribute data is received may implement, at least partially, the automated data analysis system 102. The information or data corresponding to the data set attributes may comprise metadata, for example. The data set attribute data may be received in conjunction with receiving the data set and receiving other associated information (e.g., metadata corresponding to other aspects of the data set), or the data set attribute data may be received without receiving any other information corresponding to the data set. The data set may be directly provided by a user, may be generated by a module within the ADA system 102 (e.g., the pre-processor 115) or by another system, may be generated in response to a user input, etc.

The method 300 may include determining an identity of a particular computational analysis (block 305). A particular computational analysis may be automatically determined or selected by one or more computing devices, such as the one or more computing devices at which the data set attribute data was received (block 302). In some embodiments, the computational analysis may be selected at least partially based on a previously received user input, such as a specific user indication of the particular computational analysis, or one or more previous user actions. In some embodiments, the computational analysis may be selected based on at least part of the data set attribute data, on the identity of another computational analysis, and/or on a result of an execution of another computational analysis. In some embodiments, the computational analysis may be selected from a library of computational analyses that the ADA system 102 is configured to perform, e.g., by executing respective computer-executable instructions.

The data set attribute data may be compared (block 308) to computational analysis attribute data or information corresponding to the particular computational analysis (e.g., one of the sets of indications 122a-122n of the computational analysis attribute data 128 of FIG. 1). In some embodiments and/or scenarios, data set attribute data of a grouping of the data set may be compared to the computational analysis attribute data. In some embodiments and/or scenarios, data set attribute data for multiple groupings and/or for the data set as a whole may be compared to the computational analysis attribute data. The computational analysis attribute data may comprise metadata, in an embodiment.

The computational analysis attribute data may be obtained, for example, from a system that supports automated data analysis, e.g., from an "ADA support system." The ADA support system may be included on the one or more computing devices executing the method 300, or may be included on one or more other computing devices. In an embodiment, the ADA support system may be integral with the ADA system 102, and in an embodiment, the ADA support system may be separate from but in communicative connection with the ADA system 102. In an embodiment, the computational analysis attribute data may stored on and obtained from one or more tangible, non-transitory data storage media or devices of the ADA support system, where the one or more tangible, non-transitory data storage media or devices are accessible to one or more computing devices executing the method 300, such as by a communication interface.

The method 300 may include determining a measure of compatibility (block 310) of at least a portion of the data set (e.g., one or more groupings of the data set) and the computational analysis. The determination (block 310) may be performed based on the comparison of the data set attribute data and the computational analysis attribute data (block 308). In an embodiment, the measure of compatibility may indicate a likelihood of generation of useful, meaningful, or statistically rich information when the computational analysis is performed on one or more groupings of the data set. In some embodiments, in addition to comparing data set attribute data and computational analysis attribute data, the measure of compatibility may be determined based on a resource required to perform the computational analysis on the data set or on a portion thereof, a time required to execute the computational analysis on the data set or on a portion thereof, a multiplicity of sub-analyses or sub-functions that are required to execute the computational analysis on the data set or a portion thereof, a parameter, and/or some other criteria.

If additional computational analyses are to be assessed for compatibility with the data set or a portion thereof (block 312), the method 300 may return to blocks 305-310 for each subsequent computational analysis. The identity of a subsequent computational analysis and/or at least a subset of the data set to which the subsequent computational analysis is to be compared may be determined, for example, by at least similar criteria used to select the initial computational analysis. In an embodiment, the identities of a fixed set of computational analyses are provided to the method 300 to use in determining a subsequent computational analysis.

In some embodiments, multiple instances of the blocks 305-310 of the method 300 may be performed in parallel, e.g., by multiple instances of a matching engine 120. In some instances, the multiple instances of the blocks 305-310 may be performed in parallel on data set attribute data corresponding to different groupings of the data set.

The method 300 may determine one or more computational analyses that are to be performed on at least one of the groupings of the data set (block 315). The indication determination 315 may be made based on the determined measures of compatibility (block 310), for example. In an embodiment, computational analyses having respective measures of compatibility that meet a boundary condition may be determined to be included in the one or more computational analyses that are to be performed on at least a portion of the data set. The one or more computational analyses that are to be performed on the data set may include all computational analyses that were compared against the data set (block 308), or may include a subset of the compared analyses.

In an embodiment, the boundary condition for determining the one or more computational analyses that are to be performed on at least a portion of the data set may be dynamically and automatically determined and generated for each data set. For example, the boundary condition may be determined based on a clustering of the computational analyses or of their respective measures of compatibilities, and/or the boundary condition may be based on a pre-defined threshold of suitability or compatibility. The boundary condition may be generated based on a range or diversity of types of the compared computational analyses, and/or based on a parameter. In an embodiment, in addition to one of the above criteria, determining the boundary condition and the one or more computational analyses that are to be performed may be further based on a user input or on a default setting.

The method 300 may include performing the one or more computational analyses on individual groupings, one or more sets of groupings, etc., of the data set (block 318), in an embodiment. The execution of each of the one or more computational analyses may be performed at least partially in parallel and/or at least partially in serial. Block 318 may include performing the same computation analysis multiple times on multiple different groupings or multiple different groupings of data.

The method 300 may cause indication(s) of one or more computational analyses to be presented at a user interface (block 320), along with an indication of their respective compatibility (e.g., incompatible with the data set, compatible with the data set, and/or relative degree of incompatibility or compatibility, such as previously discussed). In an embodiment, a set of computational analyses that were determined to be compatible with the data set may be presented, and, in some cases, the set of compatible computational analyses may be presented in conjunction with an indication of their respective measures of compatibility. In an embodiment, a set of computational analyses that were determined to be incompatible with the data set may be presented, and, in some cases, the set of incompatible computational analyses may be presented in conjunction with their respective measures of incompatibility. For example, a list of incompatible computational analyses may be presented along with their respective probabilities of incompatibility.

In an embodiment, respective result content data of the one or more computational analyses (whether compatible or incompatible) may be presented at the user interface, such as in one or more views. The method 300 may enable a user to change a view of the presented result content data, in an embodiment.

In some embodiments, the indications of the compatibilities or incompatibilities are not presented to the user. In some embodiments, the indication(s) of the one or more computational analyses and their respective indications of compatibility or incompatibility may be caused to be transmitted to another system, computing device, or application.

Although the method 300 is described herein as including blocks 302-320, the method 300 is not limited to including only blocks 302-320. In an embodiment, the method 300 may additionally or alternatively include any of the activities, actions, or functions of the ADA system 102 of FIG. 1, in an embodiment.

Any of the techniques described above, including the blocks described with reference to FIGS. 1 and 6, may be implemented using one or more processors that executes machine readable software or firmware instructions. Such computer program instructions may control the analysis of a computing system comprising one or more computing devices such as a desktop computer, a laptop computer, a tablet computer, a workstation, a server, a mainframe, a mobile phone (e.g., a smart phone), a telephone, a set top box, a PDA, a pager, a processing system of an electronic game, a processing system of a consumer electronics device, etc. The computing system may have one or more processors and one or more tangible, non-transitory memory devices in which the computer program instructions may be stored. The one or more processors are coupled to the one or more memory devices, and the one or more processors execute the computer program instructions. In various embodiments, computer program instructions may be written in any high level language such as the programming language used with MATHEMATICA® software systems, C, C++, C#, Java or the like or any low-level assembly or machine language. By storing computer program instructions in one or more memory devices of the computing system, the computing system is physically and/or structurally configured in accordance with the computer program instructions.

In an embodiment, the automated data analysis system 102 comprises such a computing system. The computing system may be a stand-alone device or a plurality of network devices arranged in a peer-to-peer, client-server, cloud computing or other suitable network configuration. In an embodiment, the computational analysis attribute data 128 of the ADA system 102 may be stored in a stand-alone storage device, in a memory of one or more computing devices of the ADA system 102, or in a plurality of physical storage devices having an external appearance as a single logical data storage entity.

While many methods and systems have been described herein as being implemented using one or more processors executing machine readable instructions, they may be implemented at least partially in hardware, and may be implemented by a variety of computing systems and devices. Thus, the method blocks and system blocks described herein may be implemented in one or more standard multi-purpose central processing units (CPUs), one or more special purpose processing units, or on specifically designed hardware such as an application-specific integrated circuit (ASIC) or other hard-wired device as desired. When implemented using a processor executing machine readable instructions, the machine readable instructions may be stored in any non-transitory, tangible computer readable storage medium such as on a magnetic disk, an optical disk (such as a compact disk (CD), a digital versatile disk (DVD)), a flash memory, a memory card, a memory stick, a RAM, a ROM, a database, DNA (Deoxyribonucleic Acid) or other biological or chemical media, etc.

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

What is claimed:

1. An automated data analysis system for automatically determining compatibility of an executable set of machine readable instructions implementing a computational analysis and a data set as input to the executable computational analysis to be operated upon by the executable computational analysis, comprising:

one or more tangible, non-transitory computer readable storage devices storing computational analysis attribute data, the computational analysis attribute data being information indicative of one or more respective attributes of each executable computational analysis of a set of executable computational analyses, and the one or more respective attributes indicating respective characteristics of data required or preferred for a data set to be considered compatible with the each executable computational analysis as an input to and an object of a performance of the each executable computational analysis; and one or more computing devices communicatively coupled to the one or more tangible, non-transitory computer readable storage devices, the one or more computing devices configured to:

receive data set attribute data, the data set attribute data being information indicative of one or more characteristics of a data set;

perform a comparison of the received data set attribute data and computational analysis attribute data corresponding to a particular executable computational analysis of the set of executable computational analyses;

determine a measure of compatibility between the data set and the particular executable computational analysis based on the comparison; and at least one of:

(i) select a subset of one or more executable computational analyses from the set of executable computational analyses based on the measure of compatibility corresponding to the particular executable computational analysis, the selected subset of the one or more executable computational analyses to be performed on at least a portion of the data set, or (ii) cause an indication of the measure of compatibility corresponding to the particular executable computational analysis to be transmitted to a user computer.

2. The automated data analysis system of claim 1, wherein:
the data set comprises one or more groupings of data values;
the data set attribute data comprises one or more subsets of the data set attribute data that respectively correspond to the one or more groupings of data values; and
the one or more computing devices are configured to:
perform the comparison of the data set attribute data and the computational analysis attribute data corresponding to the particular executable computational analysis at least by comparing (i) at least one subset of the data set attribute data, and (ii) the computational analysis attribute data corresponding to the particular executable computational analysis, and
determine the measure of compatibility between the data set and the particular executable computational analysis at least based on the comparison of (i) the at least one subset of data set attribute data, and (ii) the computational analysis attribute data corresponding to the particular executable computational analysis.

3. The automated data analysis system of claim 2, wherein:
the at least one subset of the data set attribute data comprises (i) a first subset of the data set attribute data that corresponds to a first grouping of data values, and (ii) a second subset of the data set attribute data that corresponds to a second grouping of data values; and
the one or more computing devices are configured to:
perform the comparison of the data set attribute data and the computational analysis attribute data corresponding to the particular executable computational analysis at least by (i) comparing (a) the first subset of the data set attribute data and (b) the computational analysis attribute data corresponding to the particular executable computational analysis, and (ii) comparing (a) the second subset of the data set attribute data and (b) the computational analysis attribute data corresponding to the particular executable computational analysis, and
determine the measure of compatibility between the data set and the particular executable computational analysis at least based on (i) the comparison of (a) the first subset of the data set attribute data and (b) the computational analysis attribute data corresponding to the particular executable computational analysis, and (ii) the comparison of (a) the second subset of the data set attribute data and (b) the computational analysis attribute data corresponding to the particular executable computational analysis.

4. The automated data analysis system of claim 1, wherein the indication of the measure of compatibility includes one of:
an indication that the data set and the particular executable computational analysis are incompatible; or
an indication that the data set and the particular executable computational analysis are compatible.

5. The automated data analysis system of claim 1, wherein the one or more computing devices are further configured to perform the particular executable computational analysis on the at least the portion of the data set when the particular executable computational analysis is selected to be performed based on the measure of compatibility.

6. The automated data analysis system of claim 5, wherein the one or more computing devices are further configured to:
generate result content data corresponding to a performance of the particular executable computational analysis on the at least the portion of the data set; and
generate result attribute data, the result attribute data being information indicative of one or more attributes of the result content data.

7. The automated data analysis system of claim 6, wherein the one or more computing devices are further configured to cause at least one of (i) at least a portion of the result content data, or (ii) at least a portion of the result attribute data to be transmitted to another system or to another application.

8. The automated data analysis system of claim 6, wherein the one or more computing devices are further configured to:
select a view of at least a portion of the result content data based on at least one of (i) a user input or (ii) the result attribute data; and
cause the view of the at least the portion of the result content data to be presented at a user interface.

9. The automated data analysis system of claim 8, wherein:
the view is a particular view selected, based on the user input, from a plurality of views of the result content data,
the one or more computing devices are further configured to cause respective indications of the plurality of views to be presented at the user interface; and
the user input corresponds to a user selection of an indication of the particular view.

10. The automated data analysis system of claim 8, wherein:
the view is a particular view; and
the particular view is selected from a plurality of views of the result content data by the one of more computing devices based on the result attribute data and the computational analysis attribute data.

11. The automated data analysis system of claim 1,
wherein the one or more computing devices are further configured to determine one or more of:
a resource required to perform the particular executable computational analysis on the at least the portion of the data set,
a time required to perform the particular executable computational analysis on the at least the portion of the data set,
one or more sub-operations required to be executed when performing the particular executable computational analysis on the at least the portion of the data set, or
a boundary condition to which the measure of compatibility is compared; and
wherein the one or more computing devices are configured to determine the measure of compatibility between the data set and the particular executable computational analysis further based on the one or more of the determined required resource, the determined time required, the determined one or more required sub-operations, or the determined boundary condition.

12. The automated data analysis system of claim 1, wherein:
the computational analysis attribute data corresponding to the particular executable computational analysis includes information corresponding to at least one of (i) a required computational analysis attribute, or (ii) a preferred or sufficient computational analysis attribute;

the required computational analysis attribute indicating a data set attribute whose presence is necessary to be compatible with the particular executable computational analysis; and the preferred or sufficient computational analysis attribute indicating a data set attribute whose presence increases a likelihood that the particular executable computational analysis will provide a useful result.

13. The automated data analysis system of claim 1, wherein the computational analysis attribute data corresponding to the particular executable computational analysis includes at least one of:

a functional attribute including a function, wherein at least a portion of the data set attribute data is an input to the function, and wherein an output of the function is indicative of the measure of compatibility between the data set and particular executable computational analysis; or a parametric attribute corresponding to at least one data value of the data set.

14. The automated data analysis system of claim 1, wherein the data set is a converted data set, and wherein the one or more computing devices are further configured to:

receive an original data set via a communication link,
analyze the original data set,
generate the converted data set based on the analysis of the original data set.

15. The automated data analysis system of claim 1, wherein the one or more computing devices are further configured to:
analyze the data set, and
generate the data set attribute data.

16. A method for automatically analyzing data sets to determine compatible executable computational analyses, each of the executable computational analyses being an executable set of machine readable instructions implementing a computational analysis, each of the data sets being input to the executable computational analyses to be operated on by the executable computational analyses, comprising:

receiving, via a communication link at one or more computing devices, data set attribute data, the data set attribute data being information indicative of one or more characteristics of a data set;

performing, at the one or more computing devices, a comparison of (i) the received data set attribute data, and (ii) computational analysis attribute data corresponding to a particular executable computational analysis, the computational analysis attribute data of the particular executable computational analysis being information that is indicative of one or more attributes of the particular executable computational analysis, and the one or more attributes of the particular executable computational analysis indicating respective characteristics of data required or preferred for a data set to be considered compatible with the particular executable computational analysis as input to and to be operated on by the particular executable computational analysis, and the particular executable computational analysis included in a plurality of executable computational analyses;

determining, by the one or more computing devices, a measure of compatibility between the data set and the particular executable computational analysis based on the comparison; and at least one of:

selecting, by the one or more computing devices, a subset of one or more executable computational analyses from the plurality of executable computational analyses based on the measure of compatibility corresponding to the particular executable computational analysis, the selected subset of one or more executable computational analyses to be performed on at least a portion of the data set, or causing, by the one or more computing devices, an indication of the measure of compatibility between the data set and the particular executable computational analysis to be generated at a user interface.

17. The method of claim 16, further comprising causing to be transmitted to another computing device, by the one or more computing devices, at least one of:

(i) an indication of the subset of the one or more executable computational analyses, (ii) an indication of at least a portion of the data set attribute data, (iii) an indication of at least a portion of the computational analysis attribute data corresponding to the particular executable computational analysis, or (iv) the indication of the measure of compatibility between the data set and the particular executable computational analysis.

18. The method of claim 16, further comprising selecting, by the one or more computing devices, the particular executable computational analysis.

19. The method of claim 18, wherein selecting, by one or more computing devices, the executable computational analysis comprises selecting, by one or more computing devices, the particular executable computational analysis by the one or more computing devices based on a user input indicating a user selection.

20. The method of claim 18, wherein selecting the particular executable computational analysis comprises selecting the particular executable computational analysis based on at least one of:

at least a subset of the data set attribute data, a result of performing another computational analysis on at least some of the data values included in the data set or on data values of another data set, an identity of the another executable computational analysis, a parameter, or a user input corresponding to at least one of (i) the selecting of the particular executable computational analysis, or (ii) selecting the data set.

21. The method of claim 16, wherein:

the computational analysis attribute data of the particular executable computational analysis is included in a set of computational analysis attribute data of the plurality of executable computational analyses; and selecting the subset of one or more executable computational analyses comprises selecting the subset of one or more executable computational analyses further based on at least one of:

a threshold corresponding to respective measures of compatibility of the subset of one or more executable computational analyses;

a clustering of the respective measures of compatibility of the subset of one or more executable computational analyses;

a diversity of executable computational analyses included in the subset of one or more executable computational analyses;

a resource required to perform each executable computational analysis of the subset of one or more executable computational analyses on the at least the portion of the data set;

a time required to perform each executable computational analysis of the subset of one or more executable computational analyses on the at least the portion of the data set;

a multiplicity of sub-operations required to perform each compared executable computational analysis of the subset of one or more executable computational analyses on the at least the portion of the data set; or a parameter.

22. The method of claim 21, wherein selecting the subset of one or more executable computational analyses comprises selecting the subset of one or more executable computational analyses further based on a user input.

23. A system for supporting a data analysis, comprising:

a plurality of indication sets stored in one or more tangible, non-transitory data storage devices, each indication set of the plurality of indication sets including respective indications of one or more computational analysis attributes of each executable computational analysis of a plurality of executable computational analyses, each of the executable computational analyses being an executable set of machine readable instructions implementing a computational analysis, and the one or more attributes of the each executable computational analysis including at least one of:

one or more characteristics or properties of data that are necessary for the data to be compatible with the each executable computational analysis as input to and to be operated on by the each executable computational analysis, or one or more characteristics or properties of the data that are sufficient for the data to be compatible with the each executable computational analysis as input to and to be operated on by the each executable computational analysis; and an interface via which one or more computing devices are communicatively coupled to the one or more tangible, non-transitory computer readable storage devices, the one or more computing devices configured to provide at least some of the indication sets to a data analysis system configured to perform at least some of the plurality of executable computational analyses based on at least some of the indication sets.

24. The system of claim 23, wherein computer readable instructions are stored on the one or more tangible, non-transitory data storage devices, and wherein the computer readable instructions, when executed by the one or more computing devices or one or more other computing devices, cause the one or more computing devices or the one or more other computing devices to perform the at least some of the plurality of executable computational analyses.

25. The system of claim 23, wherein the one or more attributes of the each respective executable computational analysis include at least one of:

a functional attribute determined by executing a respective function, or a parametric attribute determined by at least one data value.

26. The system of claim 23, wherein the plurality of executable computational analyses include:

one or more visualizations; and one or more executable computational analyses that, when performed on at least a portion of a first data set, generate a second data set different than the first data set.

27. The system of claim 23, wherein the one or more attributes of the each executable computational analysis are determined based on heuristics of the each executable computational analysis.

28. The system of claim 23, wherein the one or more attributes of the each executable computational analysis are updateable.

* * * * *